(12) United States Patent
Yoo

(10) Patent No.: US 12,093,930 B2
(45) Date of Patent: *Sep. 17, 2024

(54) VIRTUAL CODE-BASED CONTROL SYSTEM, METHOD, AND PROGRAM, CONTROL DEVICE, AND CONTROL SIGNAL GENERATING MEANS

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,140

(22) Filed: Aug. 28, 2023

(65) Prior Publication Data

US 2023/0401567 A1 Dec. 14, 2023

Related U.S. Application Data

(63) Continuation of application No. 17/575,022, filed on Jan. 13, 2022, now Pat. No. 11,775,963, which is a
(Continued)

(30) Foreign Application Priority Data

Aug. 9, 2017 (KR) .................. 10-2017-0100953
Mar. 22, 2018 (KR) .................. 10-2018-0033008

(51) Int. Cl.
*G06Q 20/36* (2012.01)
*G06F 8/30* (2018.01)
(Continued)

(52) U.S. Cl.
CPC .......... *G06Q 20/3672* (2013.01); *G06F 8/30* (2013.01); *G06F 21/31* (2013.01); *G06F 21/606* (2013.01);
(Continued)

(58) Field of Classification Search
CPC .......... G06Q 20/3672; G06Q 20/0658; G06Q 20/3274; G06Q 20/3278; G06Q 20/351;
(Continued)

(56) References Cited

U.S. PATENT DOCUMENTS 5,774,065 A * 6/1998 Mabuchi ............ G07C 9/00182
380/42
6,667,684 B1 * 12/2003 Waggamon ........ G07C 9/00309
340/5.71
(Continued)

FOREIGN PATENT DOCUMENTS

JP   H04-220030 A   8/1992
JP   2008-187400 A  8/2008
(Continued)

OTHER PUBLICATIONS

The extended European search report issued by the European Patent Office on May 7, 2020, which corresponds to European Patent Application No. 18845173.6-1213 and is related to U.S. Appl. No. 16/728,846.
(Continued)

*Primary Examiner* — J. Brant Murphy
(74) *Attorney, Agent, or Firm* — Studebaker & Brackett PC

(57) ABSTRACT

The present invention relates to virtual code-based control system, method and program, a control device and a control signal generating means. A control method on the basis of a control signal comprising a virtual code according to an embodiment of the present invention comprises: a control signal receiving step for a control module receiving, from a control signal generating means, a control signal generated by means of combining a plurality of specific codes in accordance with a particular rule; a step for the control module extracting the plurality of specific codes comprised in the virtual code; and a command searching step for the
(Continued)

control module searching for a storage location comprising a particular command on the basis of the plurality of specific codes.

20 Claims, 15 Drawing Sheets

Related U.S. Application Data continuation of application No. 16/728,846, filed on Dec. 27, 2019, now Pat. No. 11,250,417, which is a continuation of application No. PCT/KR2018/007848, filed on Jul. 11, 2018.

(51) Int. Cl.
| | |
|---|---|
| *G06F 21/31* | (2013.01) |
| *G06F 21/60* | (2013.01) |
| *G06Q 20/06* | (2012.01) |
| *G06Q 20/32* | (2012.01) |
| *G06Q 20/34* | (2012.01) |
| *G06Q 20/38* | (2012.01) |
| *G06Q 20/40* | (2012.01) |
| *G06Q 40/02* | (2023.01) |
| *H04L 9/32* | (2006.01) |
| *H04L 9/40* | (2022.01) |
| *H04W 12/033* | (2021.01) |

(52) U.S. Cl.
CPC ..... *G06Q 20/0658* (2013.01); *G06Q 20/3274* (2013.01); *G06Q 20/3278* (2013.01); *G06Q 20/351* (2013.01); *G06Q 20/354* (2013.01); *G06Q 20/3674* (2013.01); *G06Q 20/382* (2013.01); *G06Q 20/385* (2013.01); *G06Q 20/4093* (2013.01); *G06Q 40/02* (2013.01); *H04L 9/3213* (2013.01); *H04L 9/3228* (2013.01); *H04L 63/0428* (2013.01); *H04W 12/033* (2021.01); *H04L 2209/56* (2013.01); *H04L 2209/80* (2013.01)

(58) Field of Classification Search
CPC ............. G06Q 20/354; G06Q 20/3674; G06Q 20/382; G06Q 20/385; G06Q 20/4093; G06Q 40/02; G06Q 20/326; G06Q 20/3821; G06F 8/30; G06F 21/31; G06F 21/606; G06F 21/30; G06F 21/64; H04L 9/3213; H04L 9/3228; H04L 63/0428; H04L 2209/56; H04L 2209/80; H04L 2463/102; H04L 63/0807; H04L 9/3234; H04L 63/0838; H04W 12/033; H04Q 9/04; H04Q 2209/40
See application file for complete search history.

(56) References Cited

U.S. PATENT DOCUMENTS

| | | | | |
|---|---|---|---|---|
| 7,136,995 | B1* | 11/2006 | Wann .............. | H04L 9/065 |
| | | | | 380/42 |
| 7,383,432 | B1* | 6/2008 | Barnes ............. | H04L 63/0428 |
| | | | | 713/168 |
| 8,194,856 | B2* | 6/2012 | Farris ............... | H04W 12/033 |
| | | | | 380/239 |
| 9,158,562 | B2 | 10/2015 | Jeon et al. | |
| 9,195,476 | B2 | 11/2015 | Liem | |
| 2002/0198945 | A1* | 12/2002 | Thomas ............ | G06F 21/606 |
| | | | | 709/206 |
| 2003/0105964 | A1* | 6/2003 | Brainard .......... | G06Q 20/385 |
| | | | | 713/178 |
| 2004/0172535 | A1* | 9/2004 | Jakobsson ......... | G07F 7/1008 |
| | | | | 713/168 |
| 2006/0232377 | A1* | 10/2006 | Witkowski ........ | G08C 19/28 |
| | | | | 340/5.25 |
| 2009/0016530 | A1* | 1/2009 | Farris .............. | H04L 9/32 |
| | | | | 380/271 |
| 2009/0327727 | A1* | 12/2009 | Meijer ............. | G06F 21/31 |
| | | | | 707/999.009 |
| 2012/0284792 | A1 | 11/2012 | Liem | |
| 2013/0326514 | A1 | 12/2013 | Jeon et al. | |
| 2015/0134540 | A1* | 5/2015 | Law .............. | G06Q 20/351 |
| | | | | 705/72 |
| 2016/0205551 | A1* | 7/2016 | Koriyama ......... | G06F 21/31 |
| | | | | 726/7 |
| 2019/0132731 | A1* | 5/2019 | Covain ............ | H04W 12/0431 |

FOREIGN PATENT DOCUMENTS

| | | |
|---|---|---|
| JP | 2010-231724 A | 10/2010 |
| KR | 10-2010-0134300 A | 12/2010 |
| KR | 10-1025467 B1 | 4/2011 |
| KR | 10-2012-0094481 A | 8/2012 |
| KR | 10-1316466 B1 | 10/2013 |
| KR | 10-2013-0134581 A | 12/2013 |
| KR | 10-1339723 B1 | 12/2013 |
| KR | 10-2015-0020927 A | 2/2015 |
| KR | 10-1499535 B1 | 3/2015 |
| KR | 10-1644568 B1 | 8/2016 |
| KR | 10-2016-0119296 A | 10/2016 |
| KR | 10-1675927 B1 | 11/2016 |

OTHER PUBLICATIONS

An Office Action; "Notice of Reasons for Refusal", mailed by the Japanese Patent Office on Apr. 27, 2021, which corresponds to Japanese Patent Application No. 2020-506909 and is related to U.S. Appl. No. 16/728,846.
An Office Action; "Notice of Reasons for Refusal," mailed by the Japanese Patent Office on Jul. 12, 2022, which corresponds to Japanese Patent Application No. 2021-123373 and is related to U.S. Appl. No. 17/575,022.
International Search Report issued in PCT/KR2018/007848; mailed Oct. 18, 2018.
A Notice of Allowance mailed by the Korean Intellectual Property Office on Nov. 28, 2019, which corresponds to Korean Patent Application No. 10-2018-0033008 and is related to U.S. Appl. No. 18/457,140; with English language translation.
A Notice of Allowance mailed by the Korean Intellectual Property Office on Mar. 31, 2022, which corresponds to Korean Patent Application No. 10-2022-0025698 and is related to U.S. Appl. No. 18/457,140; with English language translation.
A Notice of Allowance mailed by the Korean Intellectual Property Office on Mar. 30, 2023 which corresponds to Korean Patent Application No. 10-2022-0080658 and is related to U.S. Appl. No. 18/457,140; with English language translation.
Seo, "One-Time Virtual Card Number Generation & Transaction Protocol using Integrated Authentication Center," Journal of The Korea Institute of Information Security and Cryptology, vol. 20, No. 3, pp. 9-22, Jun. 2010.
"Disabling fraudulent credit card use with domestic technology . . . Block the source by changing the 16-digit card number in real time." an electronic newspaper, Mar. 13, 2018, 15 pages.

\* cited by examiner

1

20

VIRTUAL CODE-BASED CONTROL SYSTEM, METHOD, AND PROGRAM, CONTROL DEVICE, AND CONTROL SIGNAL GENERATING MEANS

CROSS-REFERENCE TO RELATED APPLICATIONS

The present application is a continuation of U.S. patent application Ser. No. 17/575,022, filed on Jan. 13, 2022, which is a continuation of U.S. patent application Ser. No. 16/728,846, filed on Dec. 27, 2019, which is a continuation of International Patent Application No. PCT/KR2018/007848, filed Jul. 11, 2018, which are based upon and claims the benefit of priority to Korean Patent Application Nos. 10-2017-0100953 filed on Aug. 9, 2017 and 10-2018-0033008 filed on Mar. 22, 2018. The disclosures of the above-listed applications are hereby incorporated by reference herein in their entirety.

BACKGROUND

Embodiments of the inventive concept described herein relate to a virtual code-based control system, a method, and a program, a control device, and a control signal generating means.

In general, a wireless communication signal is transmitted to a separate terminal device (e.g., a mobile terminal, a remote controller, or a controller in which a specific application is installed) to control the control device (e.g., an Internet of Things (IoT) device or an unmanned vehicle). The terminal device transmits the control command included in the wireless communication signal to the control device.

However, when a specific command is converted simply into a code and is transmitted, it is easy for another person to identify a command code for the control device, and the control device may be controlled by transmitting the same command using the same wireless communication signal (e.g., the RF signal of the same frequency when the control signal is transmitted as an RF signal). That is, a user may be deprived of the control of the control device by another person.

Accordingly, there is a need for a control system, a method, and a program that prevents another person from obtaining the command code at a specific time point to take the control of the control device, as the command code is changed at each time point.

SUMMARY

Embodiments of the inventive concept provide a virtual code-based control system, a method, and a program, a control device, and a control signal generating means that may search for and verify an actual command within a control device using a virtual code, which is changed for each unit count and is distinguished by the command, thereby preventing another person from taking over the control as the other person transmits a control signal including a specific command.

The technical problems to be solved by the present inventive concept are not limited to the aforementioned problems, and any other technical problems not mentioned herein will be clearly understood from the following description by those skilled in the art to which the inventive concept pertains.

According to an aspect of an embodiment, a control signal-based control method includes receiving, by a control module, a control signal generated at a specific time point, from a control signal generating means, extracting, by the control module, the plurality of detailed codes included in the virtual code, and searching, by the control module, for a storage location including a specific command based on the plurality of detailed codes. The virtual code is generated differently depending on the command at a same time point and is generated differently for each unit count. The control module is embedded with or installed in a control device and determines a search start point and a search path based on the plurality of detailed codes to search for the storage location when the virtual code normally generated for each unit count is received. The unit count is set to a specific time interval so as to be changed as the time interval elapses. The control signal includes a specific virtual code and the virtual code is generated by combining a plurality of detailed codes depending on a specific rule.

Furthermore, in another embodiment, the control signal generating means includes a virtual code generation function corresponding to each command and transmits a virtual code generated through a virtual code generation function corresponding to a command selected at a specific time point by a user, as the control signal.

Moreover, in another embodiment, the virtual code generation function includes a plurality of detailed code generation functions generating detailed codes, respectively and a detailed code combination function combining each detailed code depending on a specific combination rule. The detailed code generation function applies the combination rule by reflecting a unique value of the control device or a unique value of the control signal generating means. The control module includes the detailed code combination function the same as the control signal generating means to extract a plurality of detailed codes using the detailed code combination function.

Also, in another embodiment, the method further includes synchronizing, by the control module, a unit count in synchronization with the control signal generating means based on time data obtained by a location information obtaining module in the control device.

In addition, in another embodiment, the virtual code generation function includes a first code generation function and a second code generation function. The first code generation function and the second code generation function generate a different code when a corresponding command or unit count is different. The detailed code includes a first code for setting a start point of a storage location search and a second code for setting a search path from the start point to the storage location depending on a specific search method. The first code and the second code are changed for each unit count.

Furthermore, in another embodiment, when a storage location search algorithm moves a pointer on a single track based on the first code and the second code, the searching for the storage location including the specific command includes moving the pointer to a point on the track corresponding to the first code within the virtual code received from the control signal generating means, setting a location corresponding to the first code to a search start point and searching for a point matched with a storage location of the command by returning the track by the number of counts corresponding to the second code, and extracting the command included in a command storage location.

Moreover, in another embodiment, the control module stores each command in a storage location corresponding to a different initial unit count. The virtual code is composed of the first code and the second code, which are generated based on a count plus a virtual security code at a time point corresponding to the initial unit count or a command input time point. The virtual security code is not separately provided from the control signal generating means to the control module, as a code value of specific digits generated through an OTP function based on a unique value of the control signal generating means or a unique value of the control device. The method further includes verifying, by the control module, whether the virtual code is normally generated, by comparing a generation virtual security number, which is calculated based on a time value within a specific range from a time point at which the virtual code is received, with a reception virtual security code extracted from the virtual code.

According to another aspect of an embodiment, a control signal-based control method includes receiving, by a control module, a control signal generated at a specific time point, from a control signal generating means, extracting, by the control module, the one or more detailed codes and the command identification code included in the virtual code, verifying, by the control module, whether the virtual code is normally generated, based on the one or more detailed codes, and inputting, by the control module, a command corresponding to the command identification code when the virtual code is normally generated. The virtual code is generated differently depending on the command at the same time point and is generated differently for each unit count. The control module is embedded with or installed in a control device. The unit count is set to a specific time interval so as to be changed as the time interval elapses. The control signal includes a specific virtual code and the virtual code is generated by combining a command identification code and one or more detailed codes depending on a specific rule.

Furthermore, in another embodiment, the verifying of whether the virtual code is normally generated includes searching, by the control module, for a storage location using a plurality of detailed codes based on a storage location search algorithm corresponding to a specific command and verifying the virtual code by determining whether the command is stored in the storage location or whether the command within the storage location is the same as a command corresponding to the command identification code. The virtual code includes a first code and a second code. The control module includes the storage location search algorithm different depending on the command, stores each command at a storage location corresponding to a specific initial unit count in a storage location search algorithm of each command, and determines that a point moving depending on a search path corresponding to the second code from a start point corresponding to the first code is the storage location when the virtual code normally generated for each unit count is received.

Moreover, in another embodiment, the detailed code includes a virtual security code. The virtual security code is a code value of specific digits generated through an OTP function based on a unique value of the control signal generating means or a unique value of the control device. The verifying of whether the virtual code is normally generated includes verifying, by the control module, whether the virtual code is normally generated, by comparing a generation virtual security number calculated based on a time value within a specific range from a time point at which the virtual code is received with a reception virtual security code extracted from the virtual code.

According to another aspect of an embodiment, a control signal-based control method includes receiving, by a control signal generating means, a specific command input request from a user, generating, by the control signal generating means, a virtual code depending on the command input request based on a virtual code generation function corresponding to a specific command, and transmitting, by the control signal generating means, the virtual code as a control signal to a control device. The virtual code is generated by combining a first code and a second code depending on a specific rule, is generated differently depending on the command at a same time point, is generated differently for each unit count, and is used to search a storage location including the specific command by a control module within the control device. The control module determines that a point moving depending on a search path corresponding to the second code from a start point corresponding to the first code is the storage location when the virtual code normally generated for each unit count is received. The unit count is set to a specific time interval so as to be changed as the time interval elapses.

According to another aspect of an embodiment, a control signal-based control method includes receiving, by a control signal generating means, a specific command input request from a user, generating, by the control signal generating means, a virtual code depending on the command input request based on a virtual code generation function corresponding to a specific command, and transmitting, by the control signal generating means, the virtual code as a control signal to a control device. The generating of the virtual code includes extracting a command identification code corresponding to the specific command, generating one or more detailed codes, using a detailed code generation function corresponding to the command, and generating the virtual code, by combining the command identification code and the one or more detailed codes. The control device includes a control module. The control module is configured to extract the one or more detailed codes and the command identification code included in the virtual code, to verify whether the virtual code is normally generated, based on the one or more detailed codes, and to input a command corresponding to the command identification code when the virtual code is normally generated. The virtual code is generated differently for each unit count. The unit count is set to a specific time interval so as to be changed as the time interval elapses.

According to another aspect of an embodiment, a control program based on a control signal including a virtual code. The program is stored in a medium to be combined with a computer which is hardware and perform the above-described method.

According to another aspect of an embodiment, a control signal-based control method includes a control signal receiving unit receiving a control signal transmitted at a specific time point, from a control signal generating means, a detailed code extraction unit extracting a plurality of detailed codes included in the virtual code, and a command search unit searching for a storage location including a specific command based on the plurality of detailed codes. The virtual code is generated by combining a first code and a second code, which are included in the plurality of detailed codes, depending on a specific rule. The first code or the second code is generated differently depending on the command at the same time point and is generated differently for each unit count. The command search unit determines that a point moving depending on a search path corresponding to the second code from a start point corresponding to the first code is the storage location when the virtual code normally generated for each unit count is received. The unit count is set to a specific time interval so as to be changed as the time interval elapses. The control signal includes a specific virtual code.

According to another aspect of an embodiment, a control signal-based control method includes a control signal receiving unit receiving a control signal transmitted at a specific time point, from a control signal generating means, a detailed code extraction unit extracting a command identification code and one or more detailed codes, which are included in the virtual code, and a virtual code verification unit verifying whether the virtual code is normally generated, based on the one or more detailed codes, and a control determination unit inputting a command corresponding to the command identification code when the virtual code is normally generated. The virtual code is generated by combining the command identification code and the one or more detailed codes depending on a specific rule. The detailed code is generated differently depending on the command at the same time point and is generated differently for each unit count. The unit count is set to a specific time interval so as to be changed as the time interval elapses. The control signal includes a specific virtual code.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
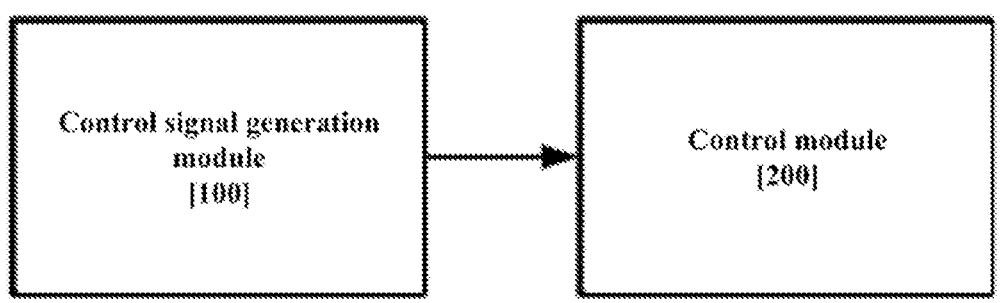
FIG. 1 is a block diagram of a virtual code-based device control system according to an embodiment of the inventive concept.

Hereinafter, exemplary embodiments of the inventive concept will be described in detail with reference to the accompanying drawings. The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terminology used herein is for the purpose of describing embodiments and is not intended to limit the inventive concept. In the specification, the singular forms include plural forms unless particularly mentioned. The terms "comprises" and/or "comprising" used herein does not exclude presence or addition of one or more other elements, in addition to the aforementioned elements.

In this specification, a 'control device' includes all devices controlled through wireless communication. For example, the control device may include an unmanned vehicle, a home appliance (e.g., a TV, a speaker, an air conditioner, or the like), or the like.

In this specification, the 'control signal' means a wireless communication signal transmitted to control a control device.

In this specification, a 'command' refers to the command predetermined as a specific control command for the control device. The 'Instruction' may be generated as specific code data.

In this specification, a 'virtual code' may be a code temporarily generated to be connected to the command and may be a code of specific digits composed of characters including numbers.

In this specification, a 'character' is a component of a code and includes all or part of uppercase alphabet characters, lowercase alphabet characters, numerals, and special characters.

In this specification, a 'code' refers to a string of characters.

In this specification, a 'detailed code' refers to a part of codes included in the virtual code. That is, when the virtual code is generated by combining a plurality of codes separately generated, the detailed code refers to a respective code constituting the virtual code after the respective code is separately generated.

In this specification, the 'unit count' is a unit set to a specific time interval and is defined to change as the time interval elapses. For example, 1 count may be used after being set to a specific time interval (e.g., 1.5 seconds).

In this specification, a 'virtual code generation function' refers to the function used to generate the virtual code.

Hereinafter, the detailed description about a virtual code-based control system, a method, and a program, a control device, and a control signal generating means according to an embodiment of the inventive concept will be described with reference to the drawings.

FIG. 1 is a connection relationship diagram of a virtual code-based control system according to an embodiment of the inventive concept.

Figure 2:
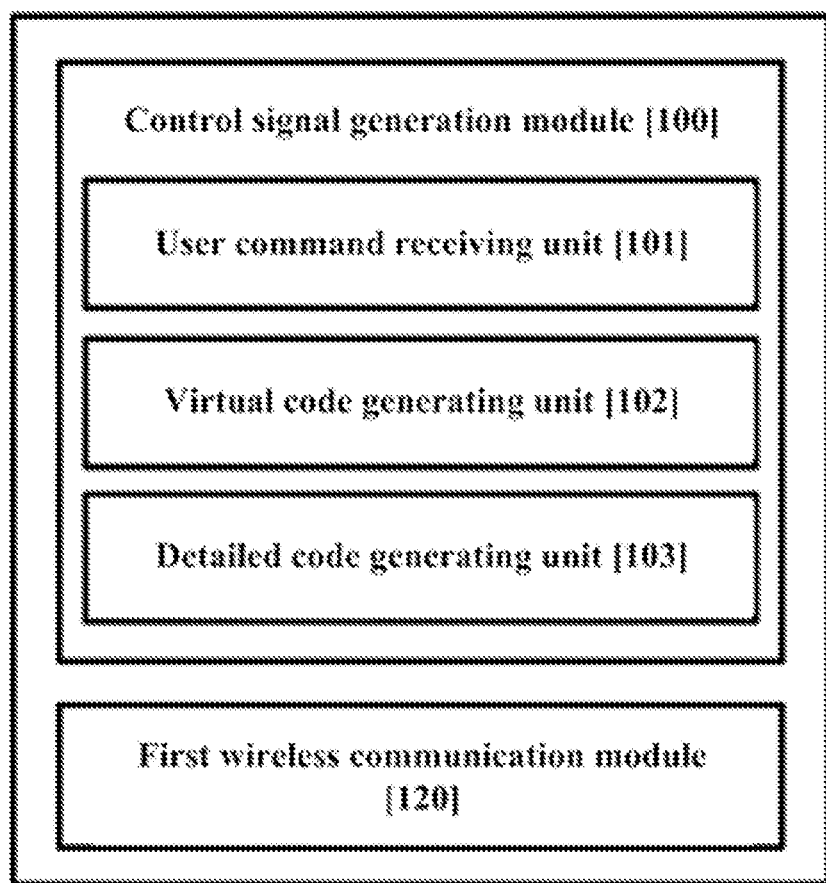
FIG. 2 is an internal configuration diagram of a control signal generating means according to an embodiment of the inventive concept.

FIG. 2 is an internal configuration diagram of a control signal generating means according to another embodiment of the inventive concept.

Figure 3:
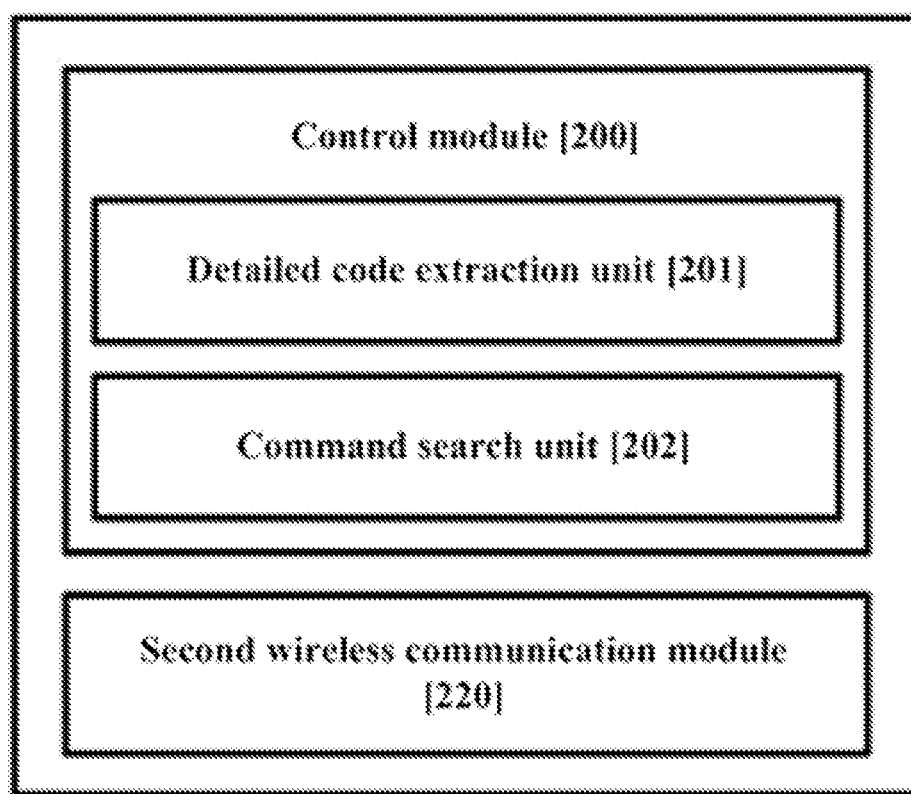
FIGS. 3 and 4 are internal configuration diagrams of a control device according to an embodiment of the inventive concept.

FIG. 3 is an internal configuration diagram of a control device according to an embodiment of the inventive concept.

Referring to FIGS. 1 to 3, a virtual code-based control system 1 according to an embodiment of the inventive concept includes a control signal generation module 100 and a control module 200.

The control signal generation module 100 generates a virtual code including information through which the control module 200 is capable of searching for a command. That is, the control signal generation module 100 generates the virtual code depending on a virtual code generation function. At this time, because the control module 200 searches for a command based on the virtual code, the control signal generation module 100 may not store the command. In this way, the connection relationship between the command and the virtual code generation function may be prevented from leaking through the hacking of the control signal generation module 100. The detailed description about the virtual code generation function will be given later. The control signal generation module 100 may be included in the control signal generating means (e.g., a controller connected to the control device through wireless communication, an application for controlling the control device installed or embedded in a mobile terminal, or the like) for controlling the control device.

The control module 200 is embedded with or installed in the control device. The control module 200 searches for a command based on the virtual code, which is generated and provided by the control signal generation module 100. The control module 200 may store the same virtual code generation function as the control signal generation module 100 to search for a command from the virtual code received from the control signal generation module 100. The detailed description about the method in which the control module 200 searches for the command based on the virtual code will be given later.

Furthermore, the control module 200 verifies whether the virtual code is a code normally generated by the control signal generation module 100. The detailed description about the method in which the control module 200 determines whether a virtual code is normal will be given later.

The control module 200 receives the virtual code via the control signal including the virtual code transmitted from the control signal generating means including the control signal generation module 100. To this end, the control signal generating means and the control device may transmit and receive the control signal through various wireless communication methods.

That is, in one embodiment, the control signal generating means includes a first wireless communication module 120, and the control device includes a second wireless communication module 220. The second wireless communication module 220 receives the control signal generated by the control signal generation module 100, from the first wireless communication module 120. Also, when the control device provides status information of the control device to a control signal generating means, the second wireless communication module 220 transmits a wireless communication signal including the status information to the first wireless communication module 120. The first wireless communication module 120 and the second wireless communication module 220 may transmit and receive signals through various communication schemes such as Bluetooth, LTE, 3G, Wi-Fi, RF, and the like.

Moreover, in another embodiment, the first wireless communication module 120 and the second wireless communication module 220 perform a process of generating a code for command verification and a verification process. That is, the first wireless communication module 120 may generate the code for command verification in the same manner as a manner in which the control signal generation module 100 generates a virtual code. That is, a function of generating a code for verification applies the same virtual code generation method (for example, a method in which a control signal generation module generates a virtual code by means of a virtual code generation function and a control module searches for an actual command corresponding to the virtual code) described later; the first wireless communication module 120 generates the code for command verification and a second wireless communication module determines whether the code for command verification is transmitted by the control signal generating means matched with the control device, by determining whether the code for command verification is generated normally. The second wireless communication module 220 verifies the code for command verification in the same manner as a manner in which the control module 200 verifies the virtual code. The rule different from a virtual code generation function may be applied to a function of generating a code for command verification. At this time, the first wireless communication module 120 transmits the final code in the form of the combination of the virtual code and the code for command verification to the second wireless communication module 220; the second wireless communication module 220 separates the virtual code and the code for command verification from the final code and performs the verification process by means of the code for command verification. The final code may be generated by the specific rule that combines the code for command verification with the virtual code, and the first wireless communication module 120 and the second wireless communication module 220 include the same combination rule.

Referring to FIG. 2, the control signal generating means according to an embodiment of the inventive concept includes the control signal generation module 100 and the first wireless communication module 120. The control signal generating means may be a device in which a program corresponding to the control signal generation module 100 is embedded or a program or an application corresponding to the control signal generation module 100 is installed. For example, the control signal generating means may be a smartphone in which an application corresponding to the control signal generation module 100 is installed or a wireless controller in which the control signal generation module 100 is embedded.

The control signal generation module 100 generates the virtual code depending on the control command entered from a user. In an embodiment, the control signal generation module 100 may include a user command receiving unit 101, a virtual code generating unit 102, and a detailed code generating unit 103.

The virtual code generating unit 102 may generate the virtual code by combining one or more detailed codes. According to an embodiment, the virtual code may be generated by combining a plurality of detailed codes depending on a specific rule.

That is, in an embodiment, the virtual code generation function includes all or part of the detailed code generation function and the detailed code combination function. The detailed code combination function is a rule for combining a plurality of detailed codes. Various methods may be applied to the method of generating a single virtual code by combining the plurality of detailed codes. As the example of the detailed code combination function, the virtual code generating unit 102 may generate the virtual code in the manner of alternately positioning the first code of N-digits and the second code of N-digits. Furthermore, for another example, the detailed code combination function may be a function that combines the second code behind the first code. As the number of detailed codes included in a virtual function increases, the detailed code combination function may be generated variously.

The detailed code generation unit 103 may generate one or more detailed codes. The virtual code generation function includes each detailed code generation function. For example, the virtual code generation function generates a plurality of detailed codes, using a plurality of detailed code generation functions and generates a virtual code, using the detailed code combination function to combine the plurality of detailed codes.

In an embodiment, the detailed code generation unit 103 includes a first function and a second function as detailed code generation functions to generate a first code and a second code. The first code and the second code may have the correlation for searching for the storage location of the command in the control device. However, the control signal generating means may only include the first function to generate the first code and the second function as the detailed code generation functions to generate the second code to improve security, and may not include the data about the correlation between the first code and the second code.

Furthermore, in an embodiment, when the virtual code is generated through the combination according to the specific rule of the first code and the second code, the first code and the second code may have a role of searching for the storage location at which the command is stored. For example, the first code is set to the start point of the storage location search, and the second code is set to the search path from the start point to the storage location depending on a specific search method. That is, when the virtual code generated normally for each unit count is provided from the control signal generating means, the control device determines that a point moving along the search path corresponding to the second code from the search start point corresponding to the first code is the storage location of the command. The detailed method of searching for the storage location based on the first code and the second code constituting the virtual code will be described later.

As an embodiment of a method in which the detailed code generation unit 103 generates the detailed code, the detailed code generation unit 103 generates a new detailed code for each unit count, and thus the control signal generating means generates a new virtual code for each unit count. The virtual code newly generated for each unit count is not generated redundantly. In particular, the detailed code generating unit 103 is configured such that the virtual code newly generated for each unit count is not redundantly generated between users belonging to a specific group as well as not being generated during a specified duration for a specific user or a specific control signal generating means.

As the detailed embodiment of preventing the virtual code from being generated redundantly, when generating the first code or the second code of N digits by using M characters, the detailed code generation function included in the virtual code generation function may generate $M^N$ codes as the first code or the second code and may match each code for each count from the initial time point at which the detailed code generation function is operated. For example, when setting the unit count to one second, the detailed code generation function matches $M^N$ different codes every second from the first driven time point. Moreover, when the period of using the specific detailed code generation function is set to be shorter than the time length (e.g., $M^N$ seconds in the case where 1 count is 1 second) corresponding to $M^N$ count, the first code or the second code is not redundantly generated during the usage period. That is, when the count increases with time, in the case where a user requests the control signal generating means to generate a virtual code at a specific time point, the control signal generating means may generate a code value matched with a count corresponding to a specific time point, as the first code or the second code.

As the detailed another embodiment of preventing the virtual code from being generated redundantly, when the usage period of the virtual code generation function elapses, the virtual code, the usage period of which is different from the previous usage period may be generated by changing the function (i.e., the first function or the second function) to generate the first code or the second code or by changing the matching relationship between the first code and the second code. In the case where the first code generated by the first function and the second code generated by the second function are combined in the virtual code, when the first code generation function or the second code generation function are changed, the control signal generating means may apply the virtual code generation function to generate the virtual code different from the previous period to a new usage period as the order in which the first code or the second code appears differs from the order in the previous usage period. Furthermore, the control signal generating means may select the first function and the second function such that a code the same as the virtual code used in the previous usage period does not appear as the virtual code of each count in a new usage period (i.e., such that the matching relationship between the first code generated depending on the first function and the second code generated depending on the second function is not included in the matching relationship included in the previous usage period, at all counts in the new usage period). That is, after the usage period capable of applying $M^N$ codes once elapses, the virtual code generation function in a new usage period, which does not overlap with the previous usage period and in which the virtual code is not generated may be applied through adjusting of updating the virtual code generation function.

At this time, the control signal generation module 100 and the control device may store a rule of updating a virtual code generation function. That is, the control signal generation module 100 and the control module 200 may store an order or rule for applying the plurality of first and second functions to each usage cycle.

Furthermore, as the detailed other embodiment of preventing the virtual code from being generated redundantly, one of the first code or the second code included in the virtual code may be generated by reflecting a value (i.e., a command unique value) which is always present differently for each command at the same time point such that the same virtual code is not generated at the same time point with respect to another command. In an embodiment, the command unique value may be the time (or the number of counts) elapsed from a unit count or a time point (for example, the time point at which the detailed code generation function for the specific command begins to be applied, after a specific time has elapsed from the first time point at which a specific storage location search algorithm is driven in the control device) corresponding to the storage location, where each command is stored at the time of initial configuration between the specific control device and the control signal generating means, to the present. In the case where a plurality of commands are included for a single control device, when the count matched with each command is not the same (that is, when several commands are not stored at the same location on the storage location search algorithm or at the same time point), the time elapsed from the time point (or count), at which the command is matched, to the time point at which the command is entered from the user is different for each command. Accordingly, at least one of the detailed code generation functions may allow the virtual codes generated by each control signal generating means to be different for each time point, using the time elapsing from the time point (or count), at which a command is stored in a storage location search algorithm, to a specific time point as a command unique value. In this way, the control device may distinguish the control signal generating means only by receiving the virtual code without separately receiving the data for distinguishing the user.

For example, when the control device is a drone (an unmanned air vehicle), the commands capable of being selected by the user's manipulation in the control signal generating means may include an upward command, a downward command, a forward command, a backward command, and the like. The command for specific control device is set to a group, and the command search in the virtual code is performed by the storage location search algorithm included in the control device. When the first command (e.g., the upward command) is matched at a time point elapsed by time 'A' from the time of the initial configuration of the control device and the second command (e.g., the forward command) is matched at a time point elapsed by time 'B' ('B' is a value greater than 'A') in the storage location search algorithm, the time lengths, which elapse from the command storage time point at time 'C' ('C' is a value greater than B') when the virtual code generation is requested from the first user and the second user, of the first command and second command are always different from each other. Accordingly, the detailed code generation function applies the time length elapsed from a point in time when each command is stored in the storage location search algorithm, as a variable, thereby preventing the same virtual code from being generated at the same time point. Furthermore, even though two commands are received at the same time, the control device may correctly recognize each command. The storage location search algorithm may be an algorithm in which the storage location matched with the current count is changed as the count progresses. The detailed description about the storage location search algorithm will be described later.

Moreover, because the time length elapsing from the time point, at which a specific command is stored in the storage location search algorithm, continuously increases with time, the detailed code (e.g., the second code) for a specific command is not generated as the same value but is continuously generated as a different value.

Furthermore, as the detailed other embodiment of preventing the virtual code from being generated redundantly, such that a redundant virtual code is not generated in the whole period regardless of the user, the first code may be set as a code value corresponding to a time point (or count) at which the generation of a virtual code is requested, among codes matched for each count from an initial time point at which the first function for the specific command within the control device is driven; the second code may be set as a code value generated by reflecting the time (i.e., a command unique value) elapsed from the time point at which a command is matched in the storage location search algorithm; and the virtual code may be used as a code value obtained by combining the first code and the second code. Because the first code has a different code value for each count and the second code has a different code value for each command at the same time point, the virtual code obtained by combining the first code and the second code may be output as a different code value for all control signal generating means at every time point.

In another embodiment, the virtual code includes a command identification code for identifying the command type. That is, when the specific command is entered from the user, the virtual code generating unit 102 extracts the command identification code corresponding to the specific command and then includes the command identification code in the virtual code. The command identification code may allow the control module 200 to identify the corresponding command as soon as the control module 200 receives the virtual code. After the control module 200 determines the command through the command identification code, the control module 200 verifies the virtual code based on the detailed code in the virtual code to determine whether to enter the command as a control command.

Moreover, the command identification code may be combined at the predetermined location within the virtual code. When the virtual code generation function is assigned for each command, the control module 200 may extract the command identification code from the virtual code and then may determine a command type. Accordingly, the command identification code may be combined at predetermined location (e.g., the first N-digits of the virtual code) within the virtual code so as to be detachable without the separate function.

When the virtual code includes a command identification code, in an embodiment, the control module 200 divides each command for a specific control device into separate groups and uses each command through a separate storage location search algorithm or a separate virtual code generation function, and the control signal generation module 100 transmits the virtual code including the command identification code corresponding to each command.

In particular, the virtual code generating unit 102 may generate the virtual code by adding a virtual security code generated based on an OTP function corresponding to a specific command to the command identification code. After the control module 200 receives the virtual code, the control module 200 determines the command type by using the command identification code and verifies whether the virtual code is generated normally, using the virtual security code. The method in which the control module 200 verifies the virtual code using the virtual security code will be described later.

Furthermore, the virtual code generating unit 102 may generate a plurality of detailed codes (e.g., the first code and the second code) suitable for the storage location search algorithm matched to a specific command identification code and may generate the virtual code in combination with the command identification code. That is, the control module 200 may individually drive the storage location search algorithm for each command. As such, the virtual code generating unit 102 may separately include the virtual code generation function for each command so as to correspond to a respective storage location search algorithm in the control module 200. The method in which the control module 200 verifies the virtual code using the storage location search algorithm and the detailed code for each command will be described later.

Furthermore, in another embodiment, one of a plurality of listing rules that lists M characters in ascending order may be applied to the virtual code generation function (in detail, each detailed code generation function). That is, the control signal generating means (i.e., the control signal generation module 100) may variously apply rules for listing M characters in ascending order, to each control device or the detailed code generation function for each command. In detail, for each control device (i.e. for each device with different identification values), a virtual code generation function to which different listing rules are applied may be applied for independent control of each device, and the virtual code generation function to which different listing rules are applied depending on each storage location search algorithm may be applied when the virtual code includes the command identification code.

For example, the listing rule for listing uppercase alphabetic characters in ascending order may be the order of A, B, C, . . . , and Z that is the general order or may be the order of A, C, B, . . . , and Z. As the listing rule is changed in the virtual code generation function, the order in which the codes are matched sequentially is different for each count from the initial time point at which the virtual code generation function is operated. The control module 200 may include and store the code generated depending on the same listing rule, which is matched with each count, or the same listing rule itself, in the virtual code generation function. Accordingly, the virtual code generation function may include different detailed code combining functions or different character listing rules for each device or for each command (when the virtual code includes the command identification code), thereby having different virtual code generation functions for each group.

Moreover, according to an embodiment, the virtual code includes a virtual security code. For example, the virtual code includes one or more detailed codes and the virtual security code or includes the virtual security code as the detailed code. The security code is a code generated based on the specific security code generation function and is used to verify whether a virtual code is normal. The security code generation function generates the security code of the specific digits, using time data and the unique value of the control signal generating means or the control device as a function value.

An example of a procedure of determining whether a virtual code is normal, using the virtual security code is as follows. The control module 200 may receive a unique value (e.g., the unique value of a smartphone in which an application for control is installed) of the control signal generating means at initial configuration to store the unique value together in the storage location of a command or to store the unique value in a separate storage connected to a command storage location. When the control signal generating means generates the virtual code including a virtual security code to provide the virtual code to the control device, the control device may obtain time data at which the virtual code is generated, based on the detailed code, may extract the unique value of the specific control signal generating means stored therein, may apply the extracted unique value together with the time data to the virtual security code generation function (e.g., OTP function) to generate the virtual security code. The control device may determine whether the virtual security code (i.e., the reception virtual security code) received by the control signal generating means is the same as the virtual security code (i.e., the generated virtual security code) calculated using the virtual security code generation function stored therein. Because there is a difference between a time point at which the control signal generating means generates a virtual code and a time point at which the control device 200 receives the virtual code, the control device 200 may calculate the virtual security code (i.e., OTP number) within a specific time range (e.g., from a time point, at which the virtual code is received, until a specific count) in consideration of time delay and may determine whether there is a value the same as the reception virtual security code received from the control signal generating means. When the reception virtual security code is the same as the generation virtual security code, the control module 200 may determine whether the virtual code is normal and then may determine that the command is a control command.

Moreover, for another example, the virtual security code generation function may generate the code of '1' digits (1' is a natural number) changed for each count to apply the code as a function value together. That is, the virtual security code generation function may include a random code generation function (e.g., the OTP function to generate a code of '1' digits) of '1' digits.

The first wireless communication module 120 outputs the virtual code as a wireless communication signal to transmit the virtual code to the control device. The first wireless communication module 120 may include various components capable of providing the virtual code to the outside. The first wireless communication module 120 includes all or part of a wireless Internet module, a short range communication module, an RF signal module, and the like.

Figure 4:
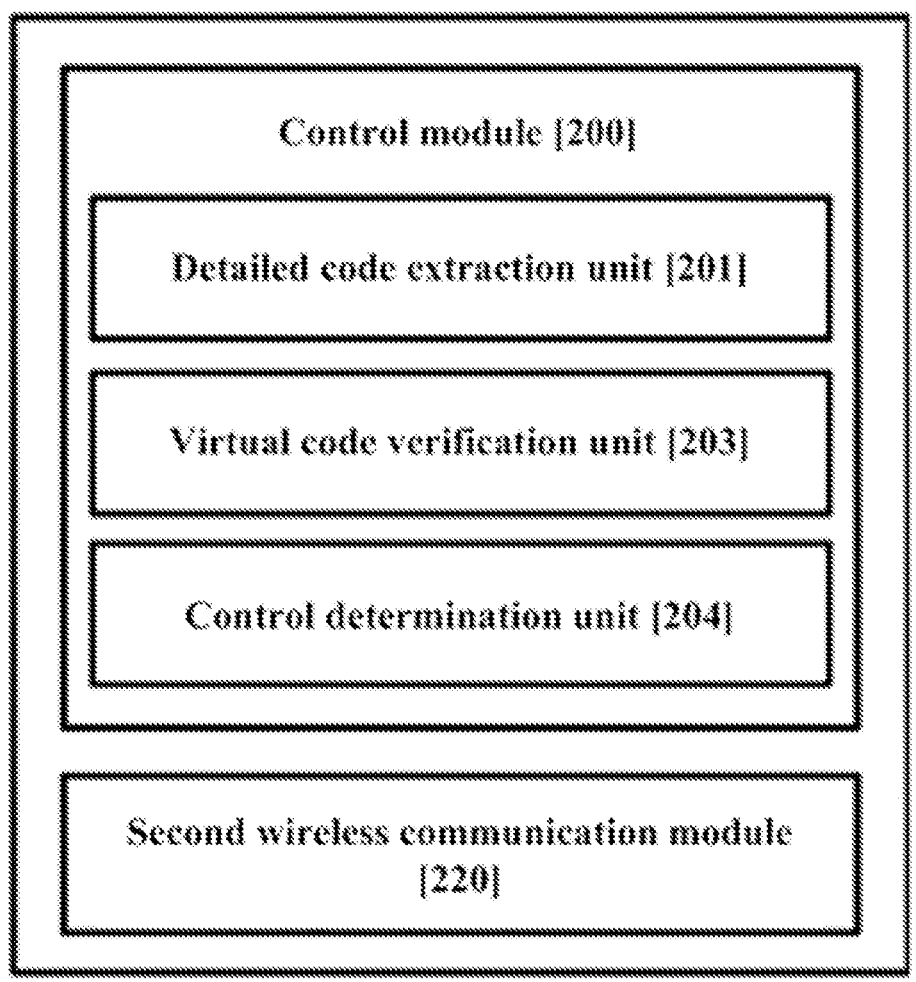

Referring to FIGS. 3 and 4, the control device according to another embodiment of the inventive concept includes the control module 200 and the second wireless communication module 220.

The second wireless communication module 220 receives a control signal from the control signal generating means. Various wireless communication methods corresponding to the first wireless communication module 120 may be applied. In detail, the second wireless communication module 220 may include a control signal receiving unit for receiving the control signal transmitted from the control signal generating means at a specific time point. The control signal includes a specific virtual code.

The control module 200 extracts the virtual code from the control signal and determines a command or verifies that the virtual code is generated normally, based on the detailed code or the command identification code extracted from the virtual code.

In an embodiment, as illustrated in FIG. 3, the control module 200 includes a detailed code extraction unit 201 and a command search unit 202. The detailed code extraction unit 201 extracts a plurality of detailed codes included in the virtual code. The virtual code is generated by combining a plurality of detailed codes depending on a specific rule; the plurality of detailed codes are generated differently depending on the command at the same time point, and are generated differently for each unit count.

The detailed code extraction unit 201 of the control module 200 may include the detailed code combination function the same as the control signal generating means, and thus the detailed code extraction unit 201 may extract a plurality of detailed codes from the virtual code by applying the detailed code combination function. For example, when the control signal generating means generates the virtual code obtained by combining two detailed codes (i.e., the first code and the second code), the detailed code extraction unit 201 may separate the first code and the second code by applying the detailed code combination function to the character string array of the virtual code.

The command search unit 202 searches for a storage location including a specific command based on the plurality of detailed codes. When the virtual code normally generated for each unit count is received, the command search unit 202 determines that a point moving depending on the search path corresponding to the second code from the starting point corresponding to the first code is the storage location. The detailed method in which the control module 200 determines the storage location will be described later in detail.

In another embodiment, as illustrated in FIG. 4, the control module 200 includes the detailed code extraction unit 201, a virtual code verification unit 203, and a control determination unit 204. The detailed code extraction unit 201 extracts the command identification code and one or more detailed codes included in the virtual code. The virtual code is generated by combining the command identification code and the one or more detailed codes depending on a specific rule; the plurality of detailed codes are generated differently depending on the command at the same time point, and are generated differently for each unit count.

For example, the detailed code extraction unit 201 extracts the command identification code at a predetermined location. In detail, because the command identification code needs to be extracted first before the specific detailed code combination function is determined, the control module 200 and the control signal generation module 100 determines attaching the command identification code at a specific location (e.g., the first N-digits of the virtual code) and the control module 200 extracts the command identification code at a predetermined location when the control module 200 receives the virtual code. When it is determined that the virtual code is generated normally, the control module 200 determines the command corresponding to the command identification code as the control command.

Also, when the virtual code includes only one detailed code (e.g., a virtual security code), the detailed code extraction unit 201 determines the remaining code other than the command identification code as the detailed code.

Furthermore, when the virtual code includes a plurality of detailed codes (e.g. the first code and the second code), the detailed code extraction unit 201 separates the plurality of detailed codes, using a detailed code combination function in the virtual code generation function corresponding to a specific command. Moreover, when the plurality of detailed codes includes the virtual security code, the detailed code extraction unit 201 separately extracts the virtual security code.

The virtual code verification unit 203 verifies whether the virtual code is normally generated based on the one or more detailed codes. In an embodiment, when only one virtual security code is included as the detailed code, as described above, the control module 200 verifies whether the virtual code is generated normally, by comparing the virtual security code (i.e., a reception virtual security code) generated and provided by the control signal generation module 100 with the virtual security code (i.e., a generation virtual security code) generated at the command reception time point within the control module 200 (hereinafter, the first verification method).

Furthermore, in another embodiment, when the first code and the second code are included as the plurality of detailed codes, the control module 200 verifies whether the virtual code is generated normally, by comparing whether the command is included in the storage location found by applying the first code and the second code to the storage location search algorithm corresponding to the specific command identification code or whether the command in the storage location is the same as the command corresponding to the command identification code (hereinafter, the second verification method). The method in which the control module 200 searches for a storage location in a storage location search algorithm using a first code and a second code will be described later.

Also, in another embodiment, when the first code, the second code, and the virtual security code are included as a plurality of detailed codes, the control module 200 applies at least one of the first verification method and the second verification method to verify whether the virtual code is normally generated.

When the virtual code is normally generated, the control determination unit 204 inputs a command corresponding to the command identification code. That is, the control determination unit 204 drives the control device by determining that the command corresponding to the command identification code in the normally generated virtual code is a control command.

Figure 5:
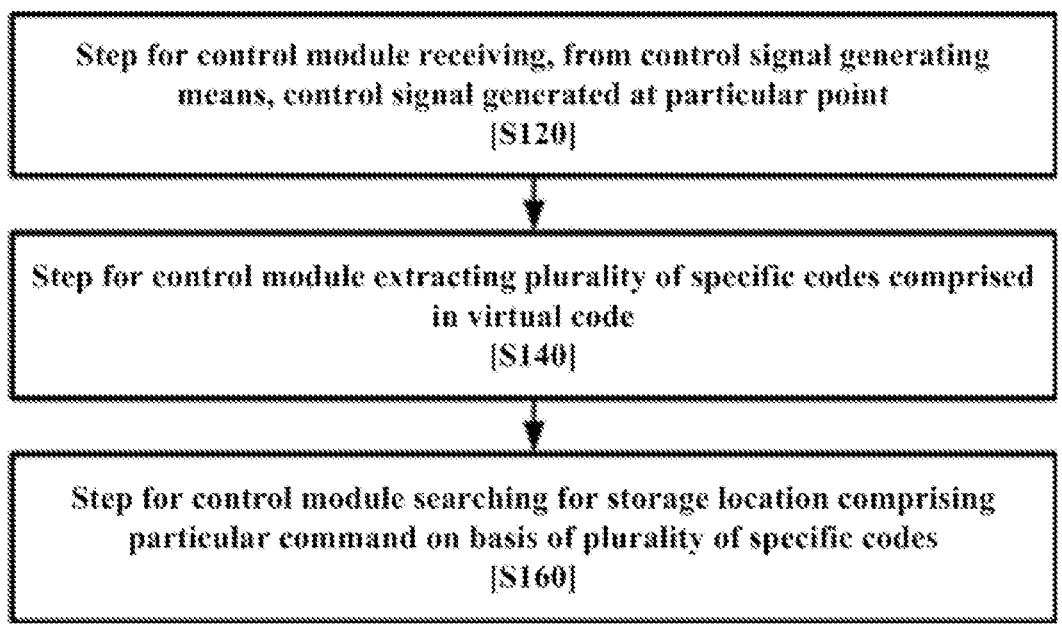
FIG. 5 is a flowchart of a virtual code-based device controlling method according to an embodiment of the inventive concept.

FIG. 5 is a flowchart of a control method based on a control signal including a virtual code according to an embodiment of the inventive concept.

Referring to FIG. 5, a control signal-based control method including the virtual code includes a step S120 (a step for receiving a control signal) in which the control module 200 receives a control signal generated at a specific time point from a control signal generating means, a step S140 (a step for extracting a detailed code) in which the control module 200 extracts a plurality of detailed codes included in the virtual code, and a step S160 (a step for searching for a command) in which the control module 200 searches for a storage location including a specific command based on the plurality of detailed codes.

In S120, the control module 200 receives a control signal generated at a specific time point from a control signal generating means (a step for receiving a control signal). For example, the control module 200 obtains a virtual code included within the control signal received by the second wireless communication module 220 of a control device. The control signal includes a specific virtual code corresponding to a specific command.

In S140, the control module 200 extracts a plurality of detailed codes included in the virtual code. The control module 200 extracts each detailed code by inversely applying the detailed code combination function used when the virtual code is generated.

As described above, the virtual code is generated by a virtual code generation function corresponding to a specific control device in the control signal generation module 100 and a specific command. The virtual code is generated by generating a plurality of detailed codes by a plurality of detailed code generation functions included in the virtual code generation function and combining the plurality of detailed codes depending on a specific rule (i.e., a detailed code combination function). That is, the virtual code generation function may include a plurality of detailed code generation functions that generate each detailed code and a detailed code combination function for combining each detailed code depending on a specific combination rule. The detailed code generation function applies different combination rules for each control device by reflecting the unique value of the control device or the unique value of the control signal generating means.

The virtual code is not generated redundantly regardless of a time point (or count) or a command type in which the command is entered. The detailed description about the above-described virtual code generation method is omitted.

In S160, the control module 200 searches for a storage location including a specific command based on the plurality of detailed codes (a step for searching for a command). The plurality of detailed codes have the correlation between each other; the control module 200 searches for the storage location of a command based on the correlation between the detailed codes.

The control module 200 stores a plurality of commands for a specific control device in the storage location corresponding to a different initial unit count. The control module 200 searches for the initial unit count matched by the corresponding command through the first code and the second code in the virtual code corresponding to each command. In an embodiment, the initial unit count for each command is the number of specific counts that elapse from a time point (e.g., the first time point at which the storage location search algorithm described below is driven) of the initial configuration between the control module 200 and the control signal generation module 100. The control module 200 sets a different count number from the time point of the initial configuration depending on the command.

Moreover, the control module 200 and the control signal generation module 100 sets a virtual code generation function based on the initial unit count (i.e. the number of unit counts elapsed from the time point of the initial configuration) for each command. For example, when the virtual code is composed of the first code and the second code which are detailed codes, the first code is generated based on the number of unit counts that elapsed from the initial time point to the current time point, and the second code is generated based on the number of unit counts elapsed from the time point corresponding to each command, each of the control module 200 and the control signal generates a second function generating the second code for each command. In this way, the control module 200 and the control signal generation module 100 may transmit and receive a command in the form of the virtual code.

The code generated for each unit count may be changed in a plurality of detailed codes within the virtual code (e.g., when the virtual code composed of two detailed codes, the first code and the second code is changed for each unit count), the control module 200 may adjust the point matched with the storage location of the command to the location matched with the first code and the second code, for each unit count so as to search for the storage location of the command even though the virtual code is changed for each unit count.

According to an embodiment associated with the correlation between the detailed codes constituting the virtual code, when the virtual code normally generated for each unit count is received, the control module 200 determines a search start point and a search path based on the plurality of detailed codes and searches for a storage location. In detail, when the virtual code is made through the combination of the first code and the second code, the control module 200 may set the first code to the search start point (i.e., the point for starting the search of the storage location of the command) and may apply the second code to the path for moving from the search start point to the storage location to search for the storage location. That is, when the virtual code normally generated for each unit count is received, the control module 200 determines that the search point moving along the search path corresponding to the second code from the start point corresponding to the first code is the point (e.g., storage space matched with the search point in a separate server) matched with the storage location of the command or the storage location.

According to an embodiment, when the second code includes information about the path from the search start point corresponding to the first code to the storage location, the control module 200 may search for the storage location of the command or the point matched with the storage location along the search path corresponding to the second code from the search start point corresponding to the first code.

According to another embodiment, the control module 200 may include a storage location search algorithm for adjusting the storage location of the command so as to be matched with the virtual code for each unit count. That is, the control module 200 includes the storage location search algorithm adjusting the search path to the point matched with the storage location of the command for each unit count. When the first code and the second code are changed for each unit count, the control module 200 may adjust the storage location search algorithm to be matched with the changed first code and the changed second code. The storage location search algorithm may be implemented in various forms.

Figure 6:
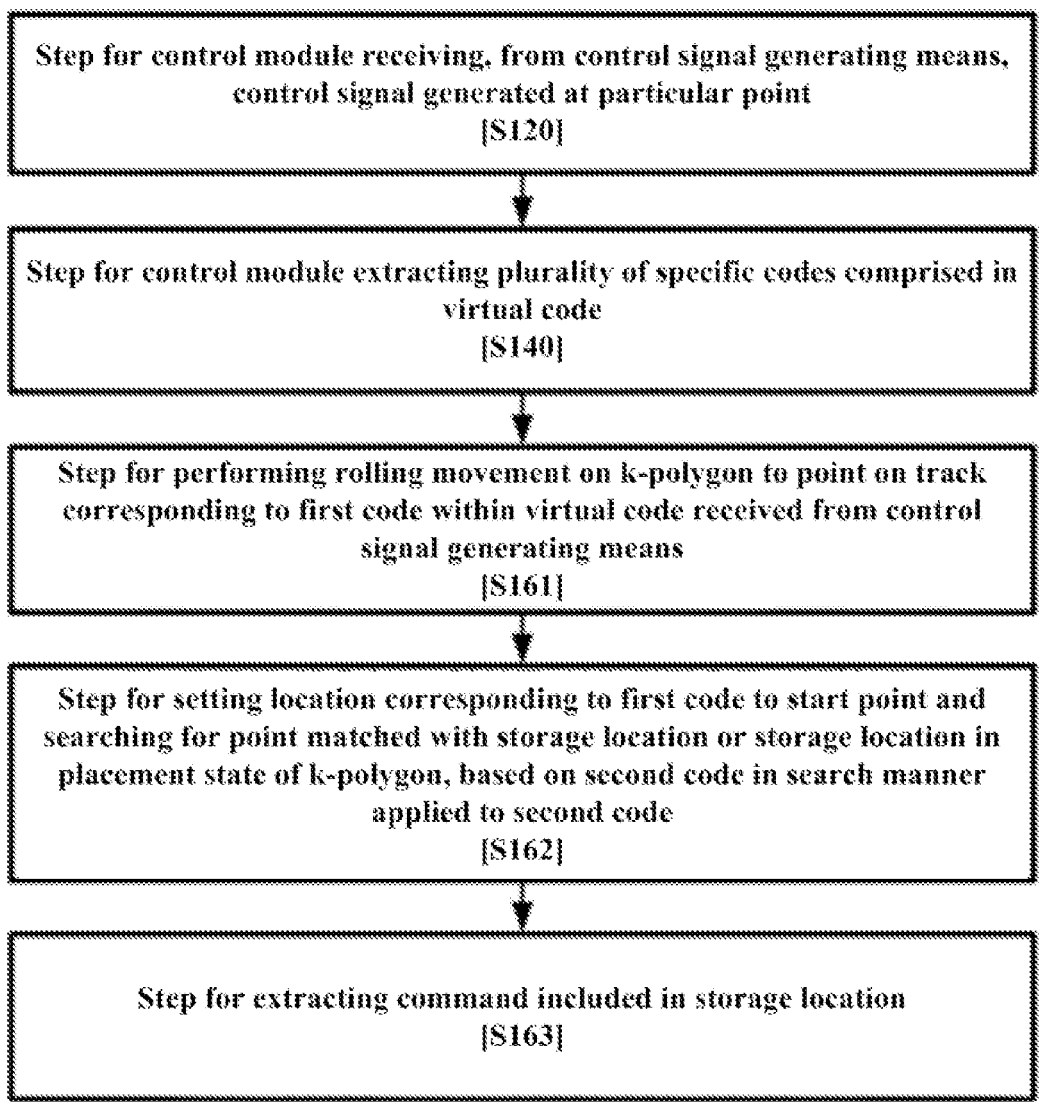
FIG. 6 is a flowchart of a virtual code-based device controlling method including a procedure of searching for a command according to k-polygon rolling movement, according to an embodiment of the inventive concept.

According to an embodiment, as illustrated in FIG. 6, the storage location search algorithm is to perform rolling movement on the k-polygon while the vertex of the k-polygon corresponds to the point at which each code is positioned on a track on which 'k' ('k' is $M^N$) codes are listed. At this time, the step S160 for searching for the command includes step S161 for performing, by the control module 200, rolling movement on the k-polygon to the point on the track corresponding to the first code within the virtual code received from the control signal generating means, step S162 (a step for searching for a storage location) for setting the location corresponding to the first code to the start point and searching for the storage location in the placement state of the k-polygon or the point matched with the storage location based on the second code depending on the search method applied to the second code, and the step S163 for extracting the command included in the storage location.

Figure 7:
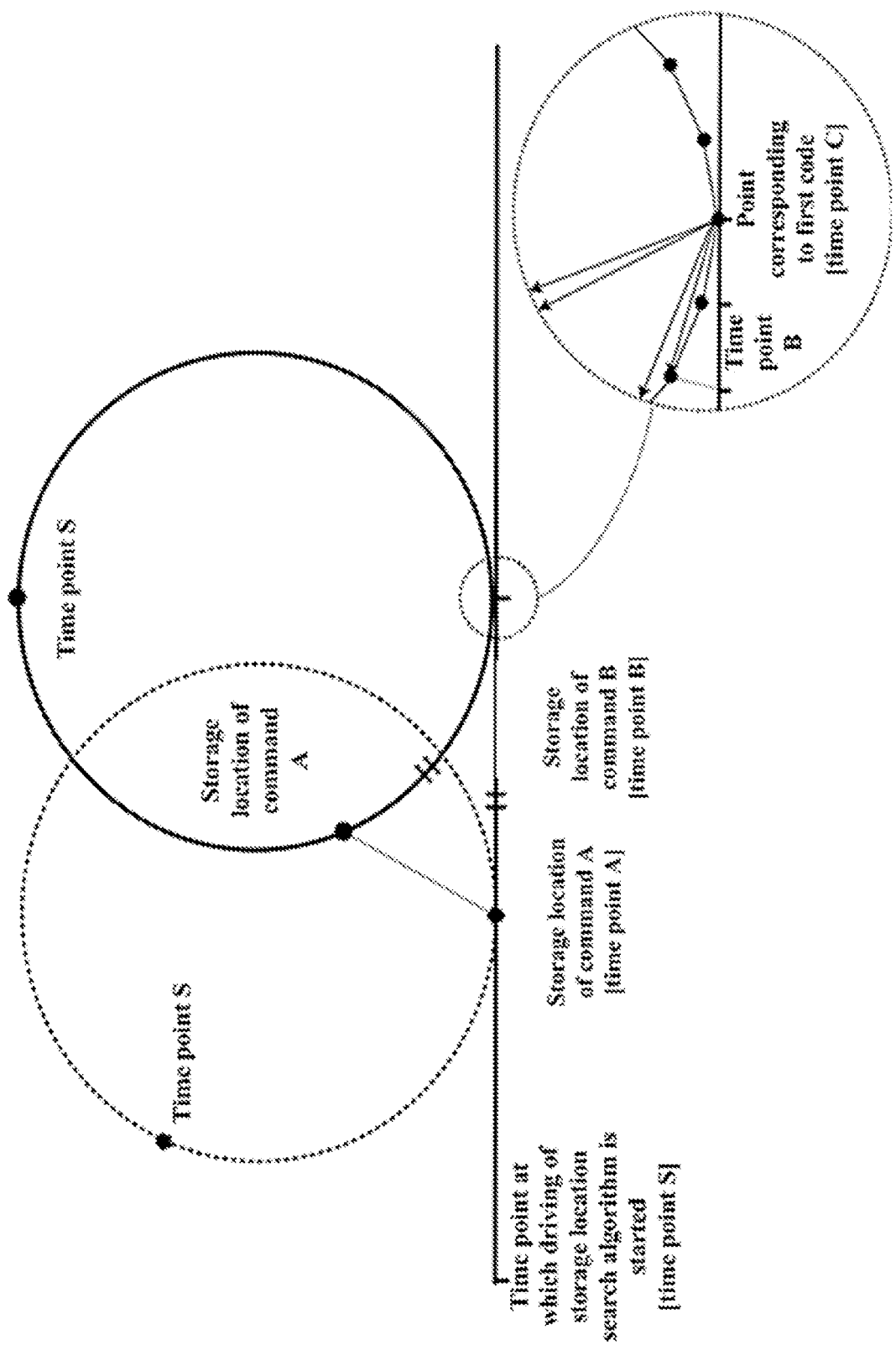
FIG. 7 is an exemplary view of a storage location search algorithm searching for a storage location of a command through rolling movement of a k-polygon, according to an embodiment of the inventive concept.

As illustrated in FIG. 7, in S161, the control module 200 performs rolling movement on the k-polygon to the point on the track corresponding to the first code within the virtual code received from the control signal generating means. The storage location search algorithm is the k-polygon ('k' is $M^N$) on which the rolling movement is performed along the track on which $M^N$ codes corresponding to the first code are listed; the vertex of the k-polygon moves while corresponding to the point at which a code is positioned on a first code track. At this time, the control module 200 may apply the k-polygon to the rolling movement (or rolling movement) such that the vertex of the k-polygon is in contact with the point corresponding to the first code.

As illustrated in FIG. 7, in S162, the control module 200 sets the location corresponding to the first code to the start point and searches for the point (i.e., the specific vertex of a k-polygon) matched with the storage location or storage location in the placement state of the k-polygon, based on the second code in the search manner applied to the second code (a step for searching for the storage location). The storage location is matched with each vertex of the k-polygon. The point at which the first code track (i.e., a first track) corresponds to the k-polygon is the start point of the storage location search corresponding to the first code. The control module 200 searches for the matching point of the storage location based on the second code, at the search start point.

Various methods may be applied to the method of searching for a storage location in the k-polygon based on the second code. In this way, the control module 200 allows an angle to be changed from the location on the first track, which the k-polygon is contact with, to an angle (e.g., a specific angle obtained by dividing 180 degrees into $M^N$ pieces so as to face the vertex of the k-polygon) corresponding to a second code, the control module 200 may search for the vertex of the k-polygon that is a storage location at which the command corresponding to the virtual code is stored.

Furthermore, for another example, in a state where the k-polygon is in contact with the point corresponding to the first code on the first track, the control module 200 divides the whole central angle (i.e., 360 degrees) into $M^N$ pieces based on the center of the k-polygon and the contact point on the first track, and matches each angle to $M^N$ second codes. At this time, the direction of the line moving by unit angles (i.e., 360 degrees/$M^N$) of specific numbers from the line connecting the center of the k-polygon to the contact point on the first track faces the specific vertex of the k-polygon. Accordingly, when the second code corresponding to the specific angle is received, the control module 200 may search for the vertex positioned in the corresponding angle direction.

Furthermore, for another example, the specific digit of the second code may be used to determine an angle calculation direction. That is, when the second code is generated using 'N' ('N' is a natural number) characters, the angle measurement direction may be determined with one digit. For example, when the control module 200 divides the whole central angle (i.e., 360 degrees) into $M^N$ pieces based on the center of the k-polygon and the contact point on the first track and matches the second code to each angle, the control module 200 may determine whether the angle is an angle measured to the right from the line connecting the center of the k-polygon to the contact point on the first track or whether the angle is an angle measured to the left, with a value of a single digit.

For example, the storage location search algorithm may assign two second codes different from each other depending on the angle measurement direction at each vertex on the k-polygon, to one vertex. That is, the second codes different from each other in the arrival with the interior angle and the arrival with the exterior angle may be matched with the one vertex and may be connected to different commands. For another example, when the second code is generated using 'N' ('N' is a natural number) characters, the storage location search algorithm may match (N−1) characters with half of the total angle (e.g., 360 degrees in the case where the total angle is divided based on the center angle) and may determine the angle application direction for reaching each vertex, using one digit.

The method of searching for a storage location in the k-polygon based on the second code is not limited thereto; various methods such as the method of searching for a point for dividing space between the point on the k-polygon corresponding to the second code and the contact point on the first track at a specific ratio, as the storage location may be applied.

Afterward, in S163, the control module 200 extracts the command included in the storage location. In other words, the control module 200 searches for the storage location corresponding to the vertex of the k-polygon and then extracts the command in the storage location.

Figure 8:
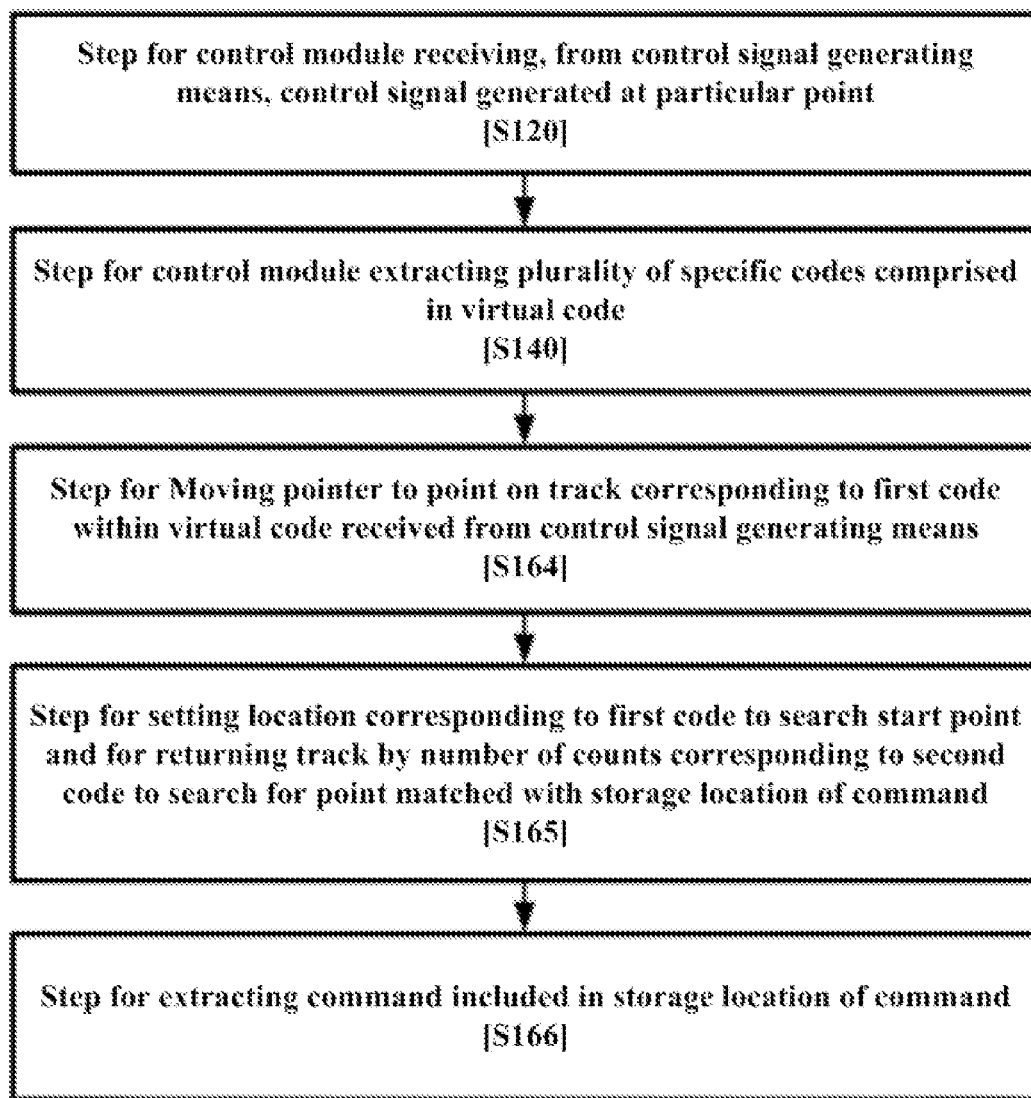
FIG. 8 is a flowchart of a virtual code-based device controlling method including a procedure of searching for a command through movement on a track, according to an embodiment of the inventive concept.

Moreover, according to another embodiment, the storage location search algorithm is moving to the point matched with the storage location of the command on the track based on a plurality of detailed codes constituting the virtual code. For example, the point matched with the storage location of the command may be a point on the track corresponding to the count (i.e., a time point) at which the command is stored in the control signal generation module 100. To this end, when the storage location search algorithm moves a pointer on a single track based on the first code and the second code, as illustrated in FIG. 8, the step S160 for searching for a command includes step S164 for moving the pointer to a point on a track corresponding to the first code within the virtual code received from the control signal generating means, step S165 for setting a location corresponding to the first code to a search start point and for returning the track by a number of counts corresponding to the second code to search for a point matched with the storage location of the command, and step S166 extracting the command included in the storage location of the command.

Figure 9:
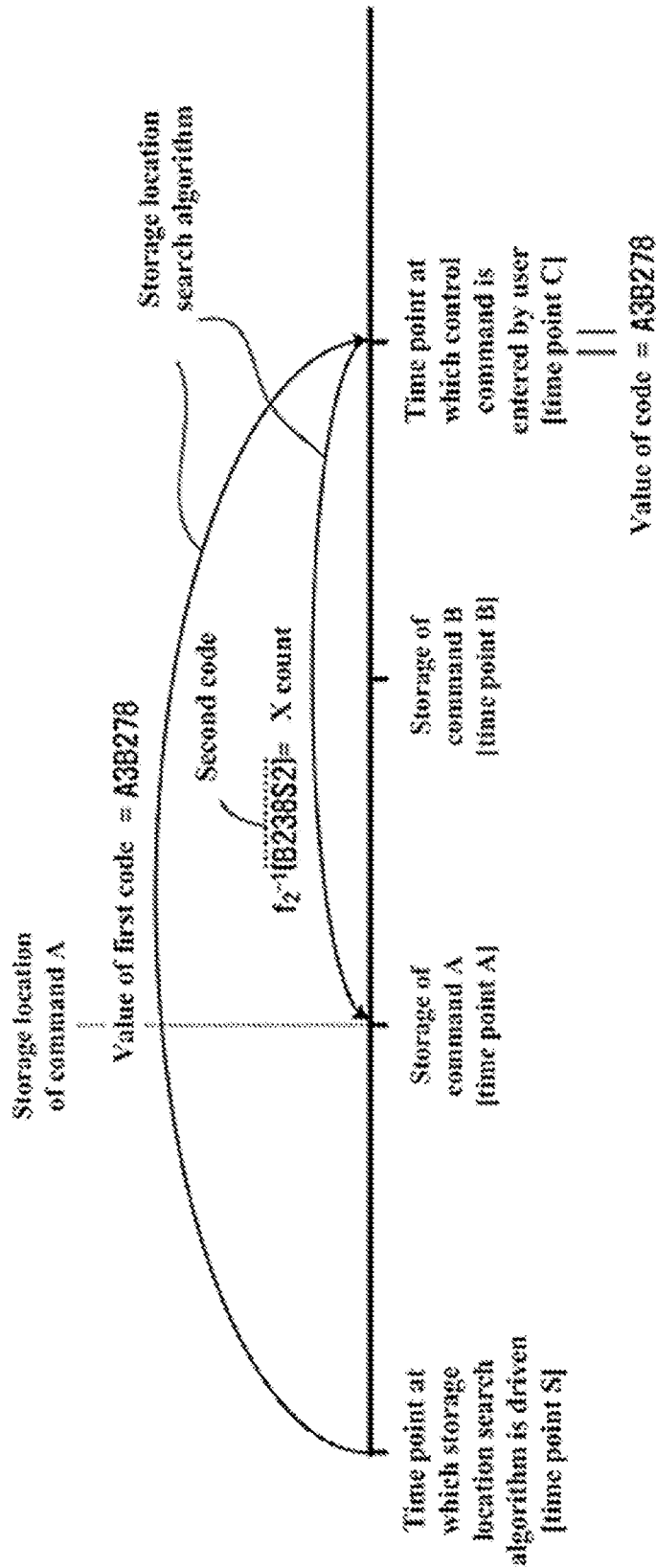
FIG. 9 is an exemplary view of a storage location search algorithm searching for a storage location of a command by moving on a track based on a detailed code, according to an embodiment of the inventive concept.

In detail, as illustrated in FIG. 9, when using the storage location search algorithm that moves on a single track based on the first code and the second code, the control module 200 may determine that the point on the track on which the pointer, which starts at a track start point from the time point at which the virtual code generation function is operated is positioned by moving the divided unit on the track whenever a unit count elapses at a time point ('A' time point), at which the command is stored is the point matched with the storage location of the command. In particular, when the virtual code includes the first code generated based on the time elapsing from a time point when a virtual code generation function is operated and the second code generated based on the time elapsing from a time point when the command is registered in the specific control signal generating module 100, the control module 200 may set the count on the track matched with the code value corresponding to the first code to a search start point and may search for the point (i.e., the point matched with the storage location of the command) on the track at the time point when the command is stored in the storage location search algorithm by returning along a track from the search start point by the count value calculated when the inverse function of the second function is applied to the second code. The control module 200 controls the control device, using the command extracted at the storage location.

Moreover, according to another embodiment, the control module 200 further includes a step of verifying whether the first code or the second code corresponds to the normally generated virtual code, by applying the first code or the second code to the inverse function of the first function or second function. For example, when the first code is a code value corresponding to the number of counts elapsed from the first time point (i.e., the time point at which the control device is initially driven or initially set) at which a specific virtual code generation function and a specific storage location search algorithm are driven in the control module 200 and the second code is a code value corresponding to the number of counts elapsed from the time point (i.e., the time point at which the specific number of counts matched with the specific command elapses from the first time point) at which the specific command is matched, the control module 200 stores a time length Ts corresponding to the specific number of counts (i.e., the number of counts between a count at which a specific command is matched and the first time point) when storing a command in a storage location. The control module 200 may calculate the elapsed time T1 from a point in time, when the virtual code generation function is operated, to the virtual code generation time point by applying the inverse function of the first function to the first code within the virtual code and may calculate the elapsed time T2 from a point in time, when the command is issued, to the virtual code generation time point by applying the inverse function of the second function to the second code within the virtual code. Afterward, the control module 200 may verify the virtual code by determining the difference between T1 and T2 corresponds to Ts.

Moreover, according to another embodiment, the virtual code further includes a virtual security code. At this time, the control module 200 may extract a virtual security code from the virtual code and may perform a procedure of verifying whether the virtual code is normally generated.

In an embodiment, the virtual security code may be generated based on the unique value of the control device or the control signal generating means. The unique value is a device unique value individually assigned to each control device or the respective control signal generation module 100. For example, when the application corresponding to the control signal generation module 100 is installed using a specific smartphone as a control signal generating means, because the unique value is assigned to each smartphone, the unique value may not be identified unless a smartphone is hacked for malicious purposes or the unique value is obtained by secretly identifying the smartphone of a user. Accordingly, the control module 200 may verify the control signal generating means by receiving the virtual security code generated based on the unique value by the control signal generating means.

Moreover, according to another embodiment, the control signal generating means may generate the virtual security code by reflecting the time value. That is, the control signal generating means may generate the virtual security code, using the OTP (user authentication using a randomly generated OTP instead of a fixed password) method. The control module 200 receives the OTP number corresponding to the virtual security code from the control signal generating means and verifies the control signal generating means by comparing the OTP number, which is generated at the count within the specific range from the received count, with the OTP number from the control signal generating means. That is, the control module 200 stores the unique value of the control device or the control signal generation module 100 together in the storage location of a command and verifies (i.e. verify whether the virtual code is generated from the control signal generating means matched with the control device) the control signal generating means by determining whether the OTP number generated from the control signal generating means is the same as the OTP number generated using the unique value extracted from the storage space of the command at the time point at which the virtual code is received.

Moreover, according to another embodiment, the virtual security code may be output by the control signal generating module 100 to the outside and may be reflected to generate the first code and the second code. For example, the virtual code is composed of the first code and the second code, which are generated based on a count plus the virtual security code at a time point corresponding to the initial unit count or a time point at which a command is entered. At this time, the virtual security code may be a code value of a specific number of digits generated through the OTP function based on the unique value of the control signal generating means or the unique value of the control device and may not be provided separately from the control signal generating means to the control module 200 because the virtual security code is already reflected to generate the first code and the second code.

Figure 10:
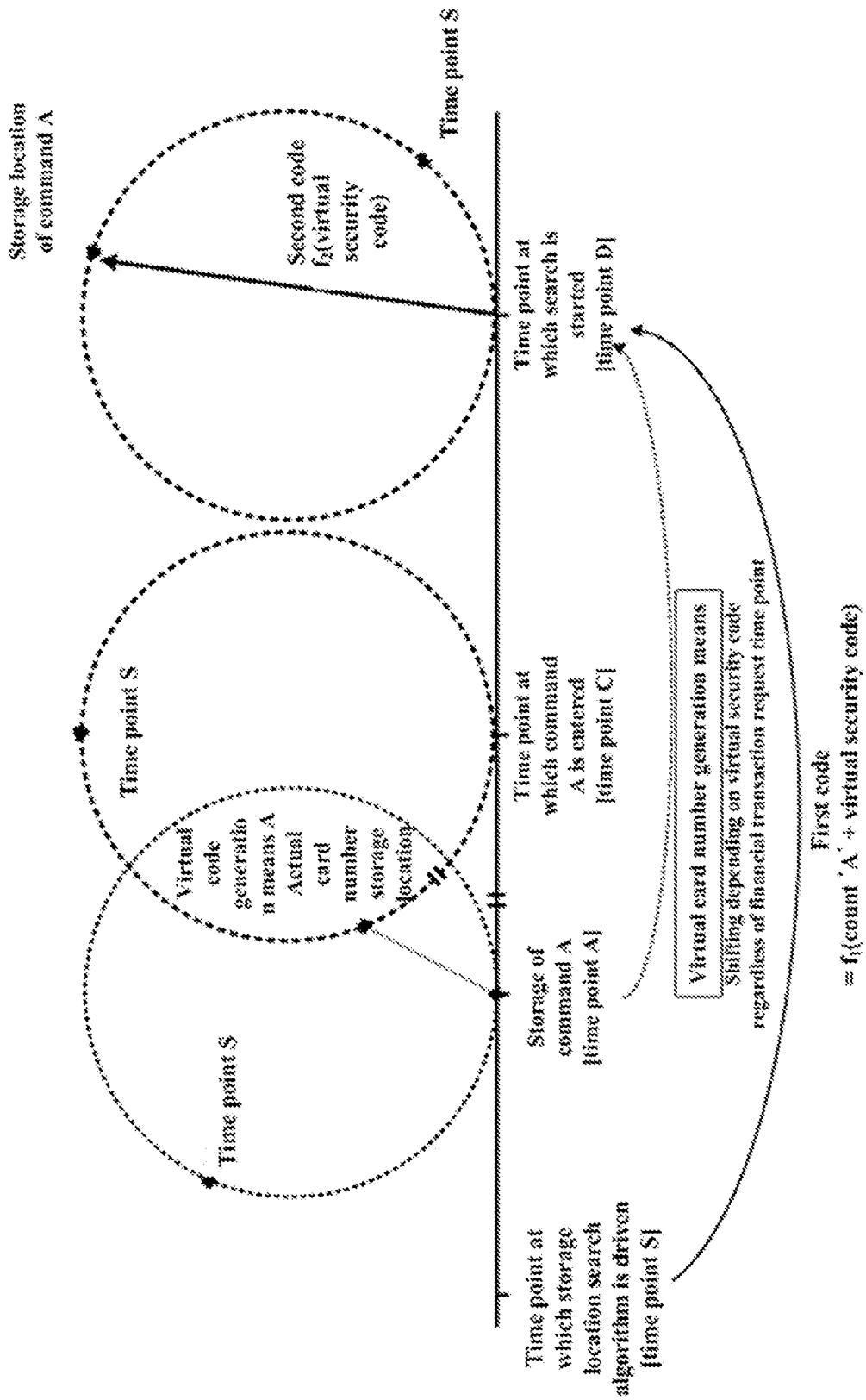
FIG. 10 is an exemplary view of a method of moving a command search time point using a virtual security code, according to an embodiment of the inventive concept.

In an embodiment, as illustrated in FIG. 10, the control signal generating means generates the first code of the count, to which the virtual security code value generated based on the unique value of the control signal generating means or the control device is added at a time point at which the command is stored, and generates the second code of the count corresponding to the virtual security code value. That is, the first code and the second code is generated based on the count shifted by the virtual security code value from time point 'A' at which the command is stored in the control signal generating means 'A'. The count shifted from the time point 'A' may be a count earlier or later than the count corresponding to the present time point depending on the generated virtual security code value. The control module 200 may search for the point with which the storage location of the command is matched, by applying the received first code and the received second code to the storage location search algorithm. As such, it is impossible for other people to identify the order in which the first code and the second code constituting the virtual code, thereby improving the security.

Furthermore, in another embodiment, after extracting the virtual security code from the second code generated based on the virtual security code, the control module 200 (i.e., OTP function) may determine whether there is a value the same as the virtual security code among the calculated OTP numbers, by entering the count within a specific range from the count, at which the virtual code is received, into the virtual security code generation function (i.e., OTP function). The control module 200 obtains the virtual security code value (i.e., an OTP function value) used to generate the second code by applying the inverse function of the second function to the second code and searches for the count at which a value the same as the virtual security code value is calculated. As the difference between a time point at which the virtual security code is generated by the control signal generating module 100 and a time point at which the control module 200 receives the virtual security code is present due to the transmission time of the virtual code, the count at which the control module 200 receives the virtual code may not be the same as a count at which the OTP number corresponding to the virtual security code is generated, and thus the control module 200 allows an error range from the count at which the virtual code is received. In this way, the control module 200 may verify whether the control signal generating module 100 transmitting the virtual code is normally matched with the command, thereby improving the security. Also, even though a user does not enter the virtual security code of the specific number of digits when the user enters a virtual code, the control module 200 itself may search for the virtual security code to verify (i.e. verify whether the virtual code is generated from the control signal generating means matched with the control device) the control signal generating means, thereby easily using the control signal generating means.

Moreover, in another embodiment, the control signal generating means generates a first code corresponding to a count to which the virtual security code value generated based on the unique value of the control signal generating means or the control device is added at a command input time point (i.e., the time point at which the control command corresponding to the specific command is input to the control signal generating means from the user) and generates a second code corresponding to the count to which the count difference between the command storage time point (time point 'A') and the command input time point (time point 'C') and the virtual security code value are added. That is, the equation in which the control signal generating means generates the first and second codes is as follows.

First code=$f_1$(count at time point C+virtual security code)

Second code=$f_2$(count at time point 'C'−count at time point 'A'+virtual security code)

($f_1$: the first function, $f_2$: the second function, time point 'A': the command storage time point, time point 'C': the count at the command input time point, virtual security code: OTP number)

The control module 200 may search for the storage location of the command based on the first code and the second code within the received virtual code and may extract the unique value of the control signal generating means or the control device together included in the storage location of the command. The control module 200 generates a virtual security code (i.e., an OTP number) within a specific count range from a time point at which a control signal is received, based on the unique value of the control signal generating means or the control device. Afterward, the control module 200 may determine whether there is a count at which the number of counts (i.e., the value obtained by applying the inverse function of the second function to the second code) corresponding to the second code is the same as the sum of the number of counts to each count within a specific count range with respect to a time point at which the control signal is received from a time point (A' time point) at which the command is stored initially and the virtual security code (i.e., OTP number). As the control module 200 searches for the point, to which the storage space of the command is matched, based on the first code and the second code, the control module 200 grasps the time point at which the command is stored initially. In this way, the control module 200 may determine whether the control signal generating means providing the virtual code is normal (i.e., whether the control signal generating means transmitting the corresponding virtual code is matched with the control device one-to-one) or whether the virtual code is normally generated.

Figure 11:
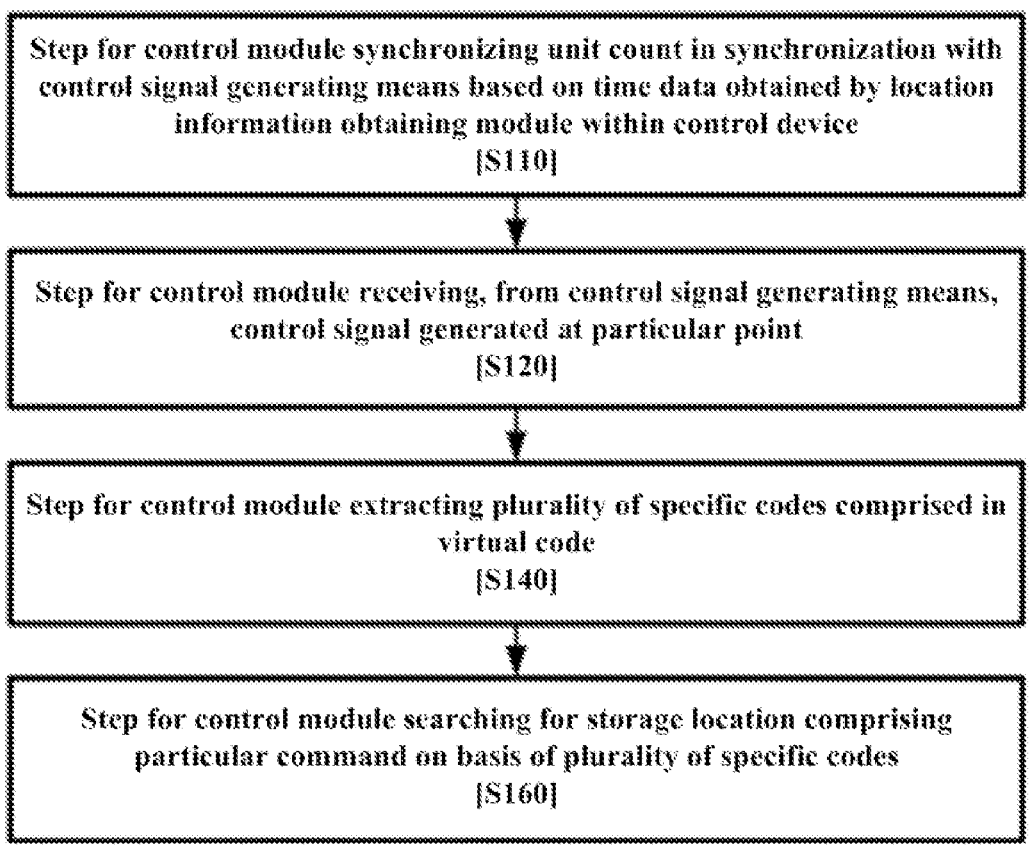
FIGS. 11 to 13 are flowcharts of a virtual code-based device controlling method of a control module, according to another embodiment of the inventive concept.

Moreover, in another embodiment, as illustrated in FIG. 11, the control module 200 further includes step S110 of synchronizing a unit count in synchronization with the control signal generating means based on time data obtained by a location information obtaining module within the control device. The control device and the control signal generation module 100 may include a location information obtaining module (e.g., GPS module). The control module 200 and the control signal generation module 100 increases the unit count as time goes on, a time synchronization process is necessary to minimize the internal timer error. The control module 200 and the control signal generation module 100 may remove a timer error by performing synchronization with the time data obtained by the location information obtaining module.

Figure 12:
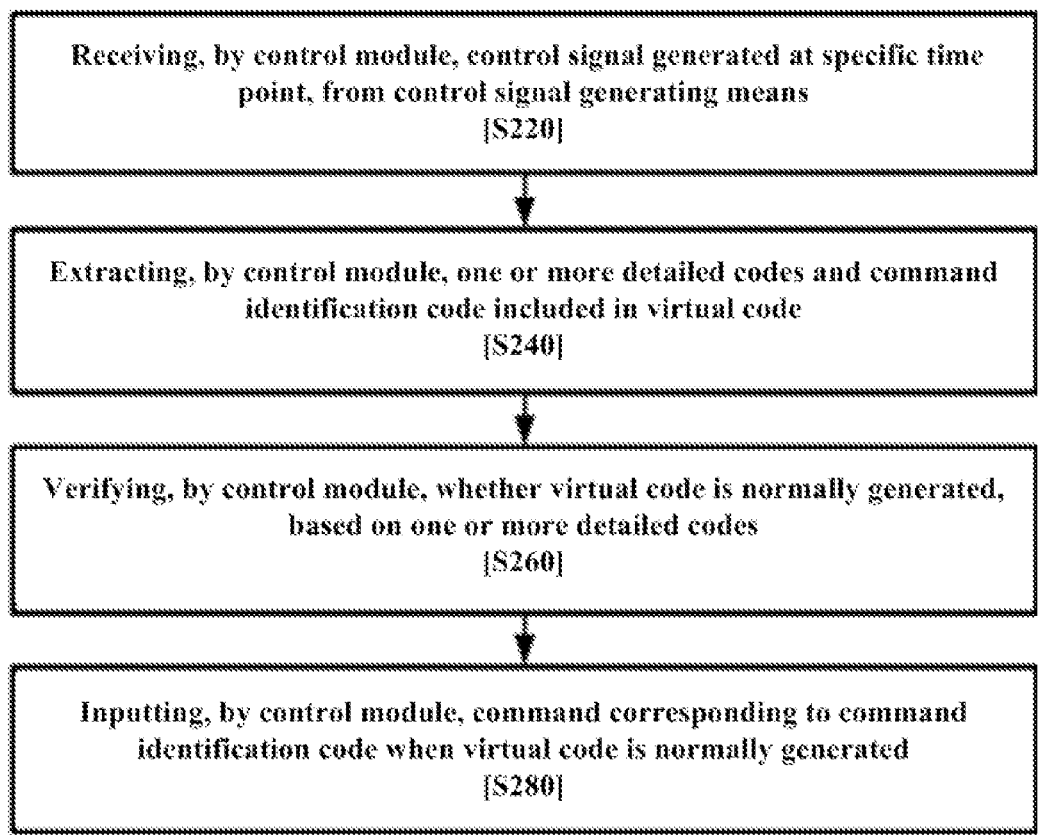

FIG. 12 is a flowchart of a control method based on a control signal including a virtual code according to an embodiment of the inventive concept.

Referring to FIG. 12, according to another embodiment of the inventive concept, a control method based on a control signal including a virtual code includes step S220 (a step for receiving a control signal) in which the control module 200 receives a control signal generated at a specific time point from a control signal generating means, step S240 in which the control module 200 extracts one or more detailed codes and the command identification code included in the virtual code, step S260 in which the control module 200 verifies whether a virtual code is normally generated, based on the one or more detailed codes, and step S280 in which the control module 200 inputs a command corresponding to the command identification code when the virtual code is normally generated. The detailed description of the aforementioned contents will be omitted.

In S220, the control module 200 receives a control signal generated at a specific time point from a control signal generating means. The control signal includes a specific virtual code, and the virtual code is generated by combining the command identification code and the one or more detailed codes depending on a specific rule. The detailed description about the above-described virtual code is omitted.

In S240, the control module 200 extracts one or more detailed codes and the command identification code included in the virtual code. The virtual code is generated differently depending on the command at the same time point and is generated differently for each unit count.

When the virtual code includes a command identification code that is a code indicating that the control signal generating means guides a command, the step S240 for extracting a detailed code extracts the command identification code within the virtual code and determines the command type of the control signal generation module 100 based on the command identification code.

In addition, as described above, the command identification code may be combined at a predetermined location such that the control module 200 may identify the command identification code without using a separate function. For example, when the virtual code includes a plurality of identification codes, a procedure of determining the virtual code generation function using the command identification code may be performed before a procedure of extracting a plurality of detailed codes. When the virtual code generation function is determined by the command identification code, the detailed code combination function included in the virtual code generation function is determined to extract a plurality of detailed codes. To this end, the command identification code may be combined at a fixed location (e.g., the specific number of digits in front of the virtual code) within the virtual code such that the control module 200 is capable of being easily separated without a separate function.

The command identification code determines the virtual code generation function or the storage location search algorithm for a specific command. In detail, when the control module 200 uses a different storage location search algorithm for each command, the control module 200 determines the storage location search algorithm corresponding to the command through the command identification code; when the control module 200 combines only the virtual security code with the command identification code as a detailed code and transmits the combined result, the control module 200 determines a virtual security code generation function generating a virtual security code corresponding to the command through the command identification code.

In S260, the control module 200 verifies whether the virtual code is normally generated based on the one or more detailed codes. As the control module 200 determines whether the virtual code is normally generated, the control module 200 determines whether the control signal generating means for transmitting the virtual code is normally matched with the control device. Various methods may be applied as a method of determining whether the virtual code is normally generated.

Figure 13:
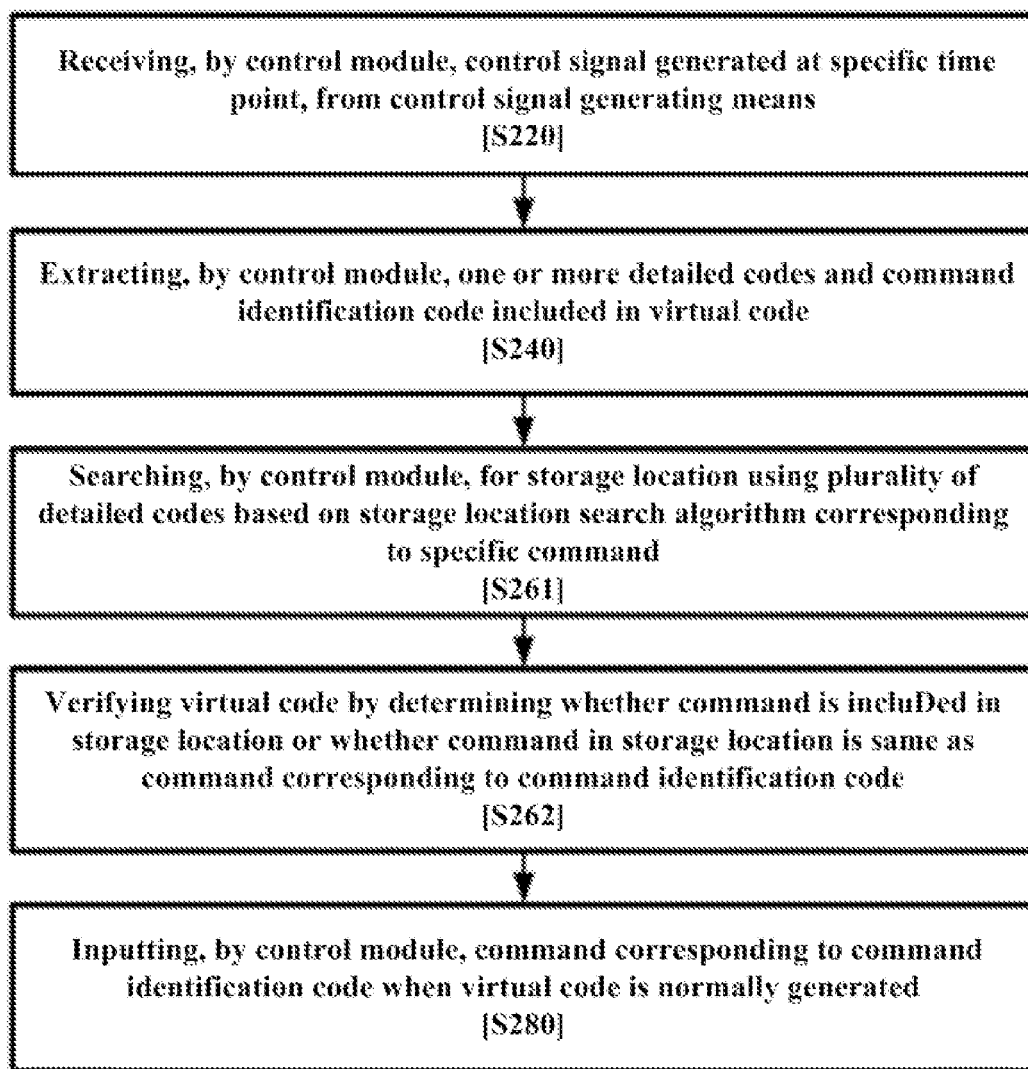

Also, in another embodiment, as illustrated in FIG. 13, step S260 for verifying the virtual code includes step S261 in which the control module 200 searches for a storage location, using a plurality of detailed codes based on a storage location search algorithm corresponding to a specific command and step S262 for verifying the virtual code by determining whether a command is included in the storage location or whether the command in the storage location is the same as the command corresponding to the command identification code. The detailed description about the above-mentioned detailed code generation method and the detailed description about a storage location search method by means of a storage location search algorithm are omitted.

In an embodiment, when the virtual code includes the first code and the second code, when the control module 200 includes the storage location search algorithm different depending on the command, when each command is stored in a storage location corresponding to specific command storage time point (i.e., an initial unit count) within the storage location search algorithm of each command, and when the virtual code normally generated for each unit count is received, the storage location is determined as the point moved along the search path corresponding to the second code from the starting point corresponding to the first code.

Furthermore, in another embodiment, in the step S260 for verifying the virtual code, the control module 200 verified whether the virtual code is normally generated, by comparing a generation virtual security number generated based on a time value within a specific range from a time point at which the virtual code is received with a reception virtual security code extracted from the virtual code. That is, the detailed code includes a virtual security code. The virtual security code may be a code value of specific digits generated through the OTP function based on the unique value of the control signal generating means or the unique value of the control device. The detailed description about the method of verifying the virtual code using the above-described virtual security code is omitted.

The virtual code may include only the virtual security code as a detailed code or may include the virtual security code together with the first code and the second code. When the detailed code is formed of only the virtual security code, the control module 200 determines that the remaining code other than the command identification code in the virtual code is a virtual security code. Moreover, the virtual security code may be used to generate the first code and the second code and may not be transmitted while being directly included in the virtual code. The detailed description about a method of using a virtual security code when the first code and the second code are generated and a method of extracting the virtual security code from the first and second code are omitted.

When the virtual code is normally generated, in S280, the control module 200 inputs a command corresponding to the command identification code.

Figure 14:
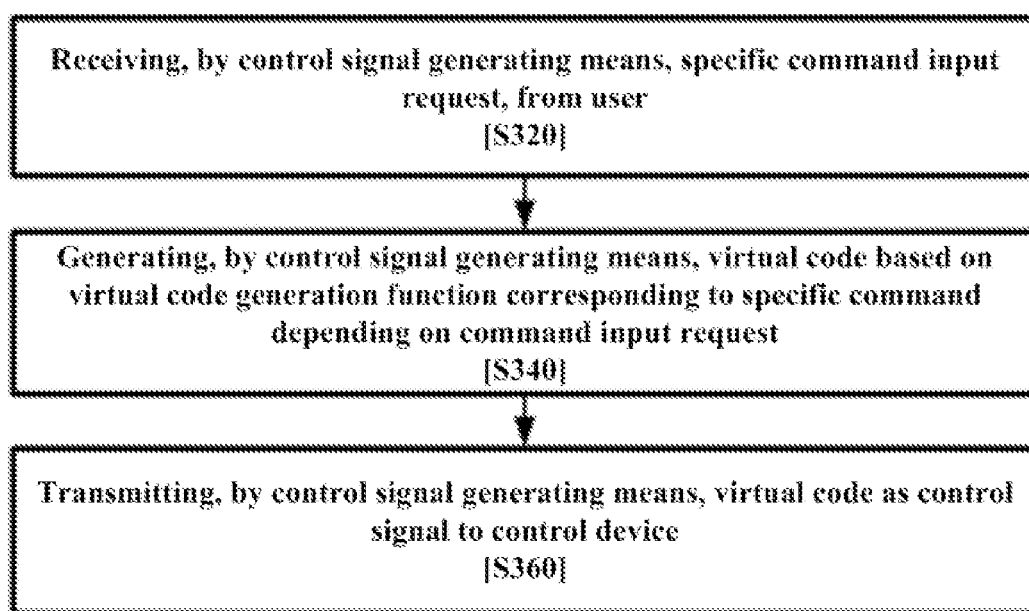
FIGS. 14 and 15 are flowcharts of a virtual code-based controlling method for a procedure in which a control signal generation module generates a virtual code, according to an embodiment of the inventive concept.

FIG. 14 is a flowchart of a control method based on a control signal including a virtual code according to an embodiment of the inventive concept.

Referring to FIG. 14, according to another embodiment of the inventive concept, a control method based on a control signal including a virtual code includes step S320 in which a control signal generating means receives a specific command input request from a user, step S340 in which the control signal generating means generates a virtual code based on a virtual code generation function corresponding to a specific command depending on the command input request, and step S360 in which the control signal generating means transmits a virtual code as a control signal to a control device. In the description of the control signal generating means, the detailed description about the contents described above is omitted.

In S320, the control signal generating means receives a specific command input request from the user. For example, the control signal generating means receives a command input request through the user's controller manipulation or user interface manipulation. The method of receiving a command input request is not limited to the described method, and various methods such as a method of receiving a voice command, or the like may be applied.

In S340, the control signal generating means generates a virtual code depending on the command input request based on the virtual code generation function corresponding to the specific command. The virtual code is generated differently depending on the command at the same time point and is generated differently for each unit count.

In an embodiment, the control signal generating means generates the first code and the second code, using the detailed code generation function and combines the first code and the second code depending on a specific rule (i.e., the detailed code combination function) to generate virtual code. At this time, the first code and the second code in the virtual code are used by the control module 200 in the control device to search for a storage location including the specific command.

Figure 15:
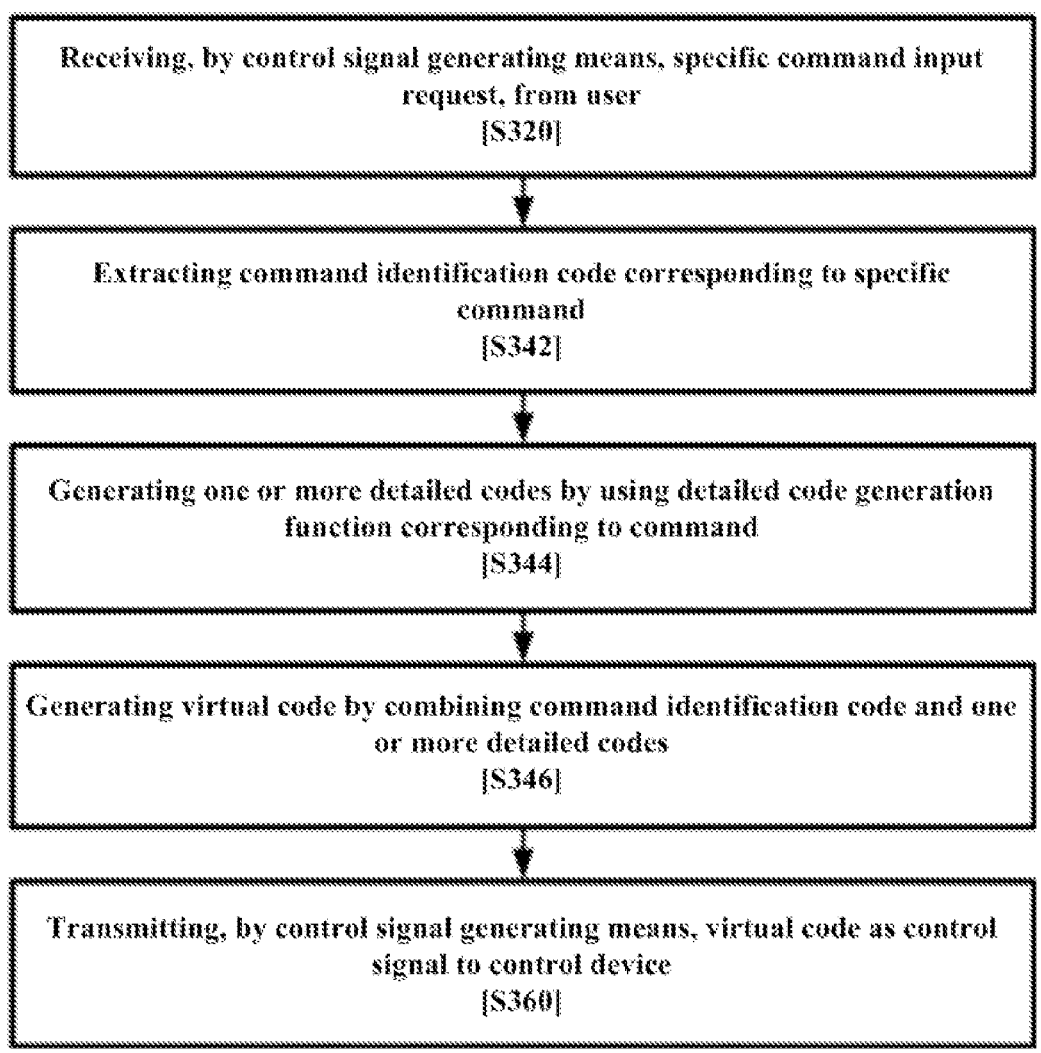

Also, in an embodiment, as illustrated in FIG. 15, the control signal generation module 100 generates virtual code in the form including a command identification code. To this end, step S340 for generating the virtual code includes step S342 for extracting a command identification code corresponding to a specific command, step S344 for generating one or more detailed codes by using the detailed code generation function corresponding to the command, and step S346 for generating the virtual code by combining the command identification code and the one or more detailed codes.

In S360, the control signal generating means transmits the virtual code to the control device as a control signal. The control signal generation module 100 makes a request for the transmission in a wireless communication manner capable of being received by the second wireless communication module 220, to the first wireless communication module 120.

Afterward, the control module 200 extracts the virtual code in the control signal and then performs a procedure of determining a command and verifying a virtual code. In the case where the control module 200 uses a single storage location search algorithm with respect to a specific control device, when the virtual code normally generated for each unit count is received, the control module 200 determines that a point moving depending on the search path corresponding to the second code in the detailed code from the starting point corresponding to the first code in the detailed code is the storage location. The control module 200 determines the command in the storage location as a control command. Also, in another embodiment, when a plurality of command identification codes are included in the virtual code, the control module 200 extracts one or more detailed codes and the command identification code included in the virtual code, verifies whether the virtual code is normally generated, based on the one or more detailed codes, and inputs a command corresponding to the command identification code when the virtual code is normally generated.

The control signal-based control method according to an embodiment of the inventive concept may be implemented by a program (or an application) and may be stored in a medium such that the program is executed in combination with a computer being hardware.

The above-described program may include a code encoded by using a computer language such as C, C++, JAVA, a machine language, or the like, which a processor (CPU) of the computer can read through the device interface of the computer, such that the computer reads the program and performs the methods implemented with the program. The code may include a functional codes associated with the function that defines functions necessary to perform the methods, and may include a control code associated with an execution procedure necessary for the processor of the computer to perform the functions in a predetermined procedure. Furthermore, the code may further include additional information necessary for the processor of the computer to perform the functions or a memory reference-related code associated with the location (address) of the internal or external memory of the computer, at which the media needs to be checked. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The stored media may mean the media that does not store data for a short period of time such as a register, a cache, a memory, or the like but semi-permanently stores to be read by the device. Specifically, for example, the stored media include, but are not limited to, ROM, RAM, CD-ROM, magnetic tape, floppy disk, optical data storage device, and the like. That is, the program may be stored in various recording media on various servers that the computer can access, or various recording media on the computer of the user. In addition, the media may be distributed to a computer system connected to a network, and a computer-readable code may be stored in a distribution manner.

Although embodiments of the inventive concept have been described herein with reference to accompanying drawings, it should be understood by those skilled in the art that the inventive concept may be embodied in other specific forms without departing from the spirit or essential features thereof. Therefore, the above-described embodiments are exemplary in all aspects, and should be construed not to be restrictive.

According to an embodiment of the inventive concept, it is possible to prevent another person from taking over the control as the other person transmits a command to a control device. That is, it is impossible to generate the virtual code corresponding to a specific command at a specific time point unless another person identically duplicates the control signal generating means of a user, thereby preventing the control device from being controlled using a device other than a control signal generating means matched with a control device.

Furthermore, it is possible to prevent the control module from incorrectly determining a command as the virtual code redundant regardless of a time point does not occur with respect to different commands.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for controlling a control device using a control signal based on a virtual code, the method comprising:

receiving, by a hardware processor of the control device, the control signal generated at a specific time point, from a control signal generating means, wherein the control signal includes the virtual code and the virtual code is generated based on at least one detailed code depending on a specific rule;

extracting, by the hardware processor, the at least one detailed code included in the virtual code;

searching, by the hardware processor, for a specific command based on the at least one detailed code; and verifying whether the virtual code is generated within a preset time range including a current time point based on the at least one detailed code, wherein the at least one detailed code is generated differently for each unit count that is changed per a specific time interval elapsing.

2. The method of claim 1, further comprising:

inputting, by the hardware processor, the searched specific command when it is determined that the virtual code is generated within the preset time range.

3. The method of claim 1, wherein the searching for the specific command includes:

determining, by the hardware processor, a search start point and a search path of a storage location of the specific command based on the at least one detailed code to search for the storage location when the virtual code normally generated for each the unit count is received, and searching the specific command based on the search start point and the search path.

4. The method of claim 3, wherein the control signal generating means having a plurality of virtual code generation functions corresponding to each of a plurality of commands, wherein the hardware processor receives the virtual code generated by the control signal generating means, and wherein the virtual code is generated by a virtual code generating function corresponding to a command selected by a user at a specific time point among the plurality of virtual code generating functions.

5. The method of claim 4, wherein the plurality of virtual code generation functions include a plurality of detailed code generation functions configured to generate detailed codes, respectively and a detailed code combination function configured to combine each detailed code depending on a specific combination rule, wherein the detailed code generation function applies the combination rule by reflecting a unique value of the control device or a unique value of the control signal generating means, and wherein the hardware processor includes the detailed code combination function the same as the control signal generating means to extract a plurality of detailed codes using the detailed code combination function.

6. The method of claim 5, wherein the plurality of virtual code generation functions includes a first code generation function and a second code generation function, wherein the first code generation function and the second code generation function generate a different code when a corresponding command or unit count is different, wherein the at least one detailed code includes:

a first code for setting a start point of a storage location search; and a second code for setting a search path from the start point to the storage location depending on a specific search method, and wherein the first code and the second code are changed for each unit count.

7. The method of claim 6, wherein when a storage location search algorithm moves a pointer on a single track based on the first code and the second code, the searching for the specific command includes:

moving the pointer to a point on the track corresponding to the first code within the virtual code received from the control signal generating means; and setting a location corresponding to the first code to a search start point and searching for a point matched with the storage location by returning the track by the number of counts corresponding to the second code.

8. The method of claim 7, wherein the hardware processor stores each command in a storage location corresponding to a different initial unit count, wherein the virtual code is composed of the first code and the second code, which are generated based on a count plus a virtual security code at a time point corresponding to the initial unit count or a command input time point, and wherein the virtual security code is not separately provided from the control signal generating means to the hardware processor, as a code value of specific digits generated through an OTP function based on a unique value of the control signal generating means or a unique value of the control device, wherein the hardware processor verifies whether the virtual code is normally generated, by comparing a first virtual security number, which is generated by the hardware processor within the preset time range from a time point at which the virtual code is received, with a second virtual security code extracted from the virtual code.

9. The method of claim 1, wherein the hardware processor synchronizes a unit count in synchronization with the control signal generating means based on time data obtained by a location information obtaining module in the control device.

10. A control device, the device comprising:

a hardware processor configured to:

receive a control signal generated at a specific time point, from a control signal generating means, wherein the control signal includes a virtual code and the virtual code is generated based on at least one detailed code depending on a specific rule;

extract the at least one detailed code included in the virtual code;

search for a specific command based on the at least one detailed code; and verify whether the virtual code is generated within a preset time range including a current time point based on the at least one detailed code, wherein the at least one detailed code is generated differently for each unit count that is changed per a specific time interval elapsing.

11. The device of claim 10, wherein the hardware processor is further configured to input the searched specific command when it is determined that the virtual code is generated within the preset time range.

12. The device of claim 10, wherein the hardware processor is further configured to:

determine a search start point and a search path of a storage location of the specific command based on the at least one detailed code to search for the storage location when the virtual code normally generated for each the unit count is received, and search the specific command based on the search start point and the search path.

13. The device of claim 12, wherein the control signal generating means having a plurality of virtual code generation functions corresponding to each of a plurality of commands, wherein the hardware processor receives the virtual code generated by the control signal generating means, and wherein the virtual code is generated by a virtual code generating function corresponding to a command selected by a user at a specific time point among the plurality of virtual code generating functions.

14. The device of claim 13, wherein the plurality of virtual code generation functions include a plurality of detailed code generation functions configured to generate detailed codes, respectively and a detailed code combination function configured to combine each detailed code depending on a specific combination rule, wherein the detailed code generation function applies the combination rule by reflecting a unique value of the control device or a unique value of the control signal generating means, and wherein the hardware processor includes the detailed code combination function the same as the control signal generating means to extract a plurality of detailed codes using the detailed code combination function.

15. The device of claim 14, wherein the plurality of virtual code generation functions includes a first code generation function and a second code generation function, wherein the first code generation function and the second code generation function generate a different code when a corresponding command or unit count is different, wherein the at least one detailed code includes:

a first code for setting a start point of a storage location search; and a second code for setting a search path from the start point to the storage location depending on a specific search method, and wherein the first code and the second code are changed for each unit count.

16. The device of claim 15, wherein when a storage location search algorithm moves a pointer on a single track based on the first code and the second code, the hardware processor is further configured to:

move the pointer to a point on the track corresponding to the first code within the virtual code received from the control signal generating means; and set a location corresponding to the first code to a search start point and searching for a point matched with the storage location by returning the track by the number of counts corresponding to the second code.

17. The device of claim 16, wherein the hardware processor stores each command in a storage location corresponding to a different initial unit count, wherein the virtual code is composed of the first code and the second code, which are generated based on a count plus a virtual security code at a time point corresponding to the initial unit count or a command input time point, and wherein the virtual security code is not separately provided from the control signal generating means to the hardware processor, as a code value of specific digits generated through an OTP function based on a unique value of the control signal generating means or a unique value of the control device, wherein the hardware processor verifies whether the virtual code is normally generated, by comparing a first virtual security number, which is generated by the hardware processor within the preset time range from a time point at which the virtual code is received, with a second virtual security code extracted from the virtual code.

18. The device of claim 10, wherein the hardware processor is further configured to synchronize a unit count in synchronization with the control signal generating means based on time data obtained by a location information obtaining module in the control device.

19. A non-transitory computer readable recording medium storing a control program that, when executed by a hardware processor of a computer device, causes the hardware processor to execute the method of claim 1.

20. A method for controlling a control device using a control signal based on a virtual code, the method comprising:

receiving, by a control signal generating means, a specific command request input from a user;

generating, by the control signal generating means, the virtual code depending on the command input request based on a virtual code generation function corresponding to a specific command; and transmitting, by the control signal generating means, the virtual code as the control signal to the control device, wherein the virtual code is generated by combining a plurality of detailed codes depending on a specific rule, wherein the plurality of detailed codes are generated differently for each unit count that is changed per a specific time interval elapsing, wherein the plurality of detailed codes included in the virtual code are extracted by the control device, wherein the specific command is searched by the control device based on the plurality of detailed codes, and wherein the virtual code is verified by the control device whether the virtual code is generated within a preset time range including a current time point based on the plurality of detailed codes.

* * * * *